United States Patent
Ishimi et al.

(10) Patent No.: US 10,936,702 B2
(45) Date of Patent: Mar. 2, 2021

(54) LICENSE MANAGING METHOD, SEMICONDUCTOR DEVICE SUITABLE FOR LICENSE MANAGEMENT AND LICENSE MANAGING SYSTEM

(71) Applicant: Renesas Electronics Corporation, Tokyo (JP)

(72) Inventors: Koichi Ishimi, Kodaira (JP); Atsushi Wakao, Tokyo (JP); Takashi Nakatani, Kodaira (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 45 days.

(21) Appl. No.: 15/558,527

(22) PCT Filed: Aug. 26, 2015

(86) PCT No.: PCT/JP2015/074020
§ 371 (c)(1),
(2) Date: Sep. 14, 2017

(87) PCT Pub. No.: WO2017/033310
PCT Pub. Date: Mar. 2, 2017

(65) Prior Publication Data
US 2018/0181726 A1 Jun. 28, 2018

(51) Int. Cl.
*G06F 7/04* (2006.01)
*H04N 7/16* (2011.01)
(Continued)

(52) U.S. Cl.
CPC ............ *G06F 21/105* (2013.01); *G06F 9/445* (2013.01); *G06F 21/10* (2013.01); *G06F 2221/0775* (2013.01)

(58) Field of Classification Search
CPC ................. G06F 21/105; G06F 9/445
(Continued)

(56) References Cited

U.S. PATENT DOCUMENTS 5,671,412 A * 9/1997 Christiano ............ G06Q 30/04
6,049,670 A    4/2000 Okada et al.
(Continued)

FOREIGN PATENT DOCUMENTS

JP   H 08-190529 A   7/1996
JP   H 10-269077 A   10/1998
(Continued)

OTHER PUBLICATIONS

International Search Report (ISR) (PCT Form PCT/ISA/210), in PCT/JP2015/074020, dated Nov. 24, 2015.
(Continued)

*Primary Examiner* — Wasika Nipa
*Assistant Examiner* — Samuel Ambaye
(74) *Attorney, Agent, or Firm* — McGinn IP Law Group, PLLC

(57) ABSTRACT

A license managing method including an execution device that executes software and a software storage device coupled to the execution device further includes a license storage device that stores license information indicating the number of licenses for permitting a license of the software, and the license managing method includes the step of license-managing of controlling storage of the software to be downloaded into the software storage device or execution of the software by the execution device based on the license information stored in the license storage device when the software whose license permission is required is downloaded.

18 Claims, 15 Drawing Sheets

FIG. 2

(51) Int. Cl.
  *G06F 21/10* (2013.01)
  *G06F 9/445* (2018.01)
(58) Field of Classification Search
  USPC .......................................................... 726/27
  See application file for complete search history.

(56) References Cited

U.S. PATENT DOCUMENTS

| | | | |
|---|---|---|---|
| 6,920,567 | B1 | 7/2005 | Doherty et al. |
| 2002/0138441 | A1* | 9/2002 | Lopatic ................. G06F 21/125 705/59 |
| 2004/0098348 | A1* | 5/2004 | Kawasaki ............... G06F 21/10 705/59 |
| 2008/0005032 | A1* | 1/2008 | Znidarsic .............. G06F 21/105 705/59 |
| 2008/0282012 | A1* | 11/2008 | Ishimi ................... G06F 1/3293 710/306 |
| 2011/0004945 | A1 | 1/2011 | Kurokawa |
| 2013/0067463 | A1* | 3/2013 | Ito ............................. G06F 8/60 717/178 |
| 2013/0103988 | A1* | 4/2013 | Ishimi ..................... G06F 11/24 714/47.1 |
| 2014/0223570 | A1* | 8/2014 | Matsushima ......... G06F 21/105 726/26 |

FOREIGN PATENT DOCUMENTS

| | | |
|---|---|---|
| JP | 2000-010776 A | 1/2000 |
| JP | 2001-266026 A | 9/2001 |
| JP | 2004-086588 A | 3/2004 |
| JP | 2010-218397 A | 9/2010 |
| WO | WO 2008/002859 A2 | 1/2008 |

OTHER PUBLICATIONS

Japanese Office Action, dated Sep. 11, 2018, in Japanese Application No. 2017-536133 and English Translation thereof.
Extended European Search Report dated Mar. 22, 2019 for European Patent Application No. 15902279.7-1224.

* cited by examiner

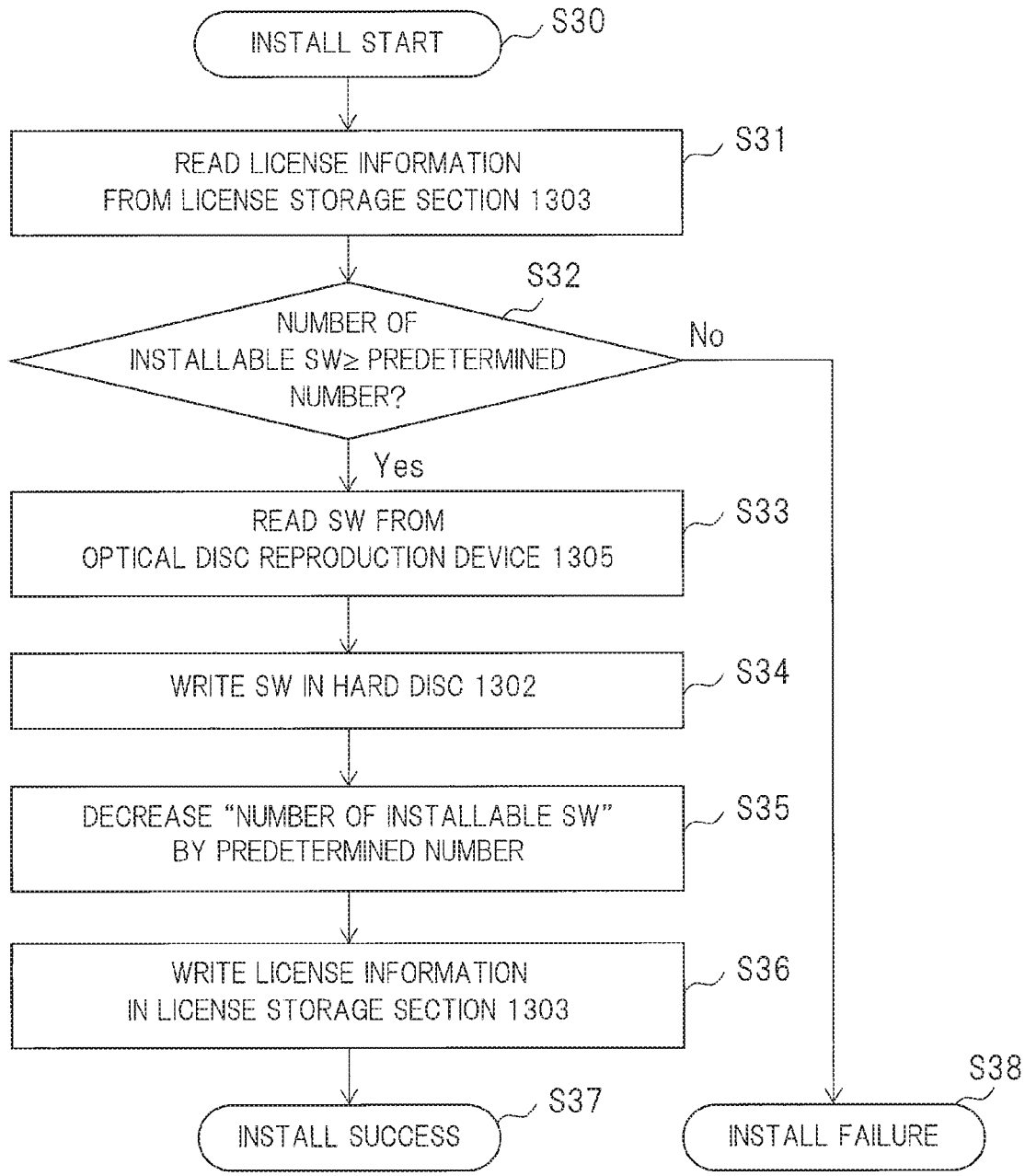

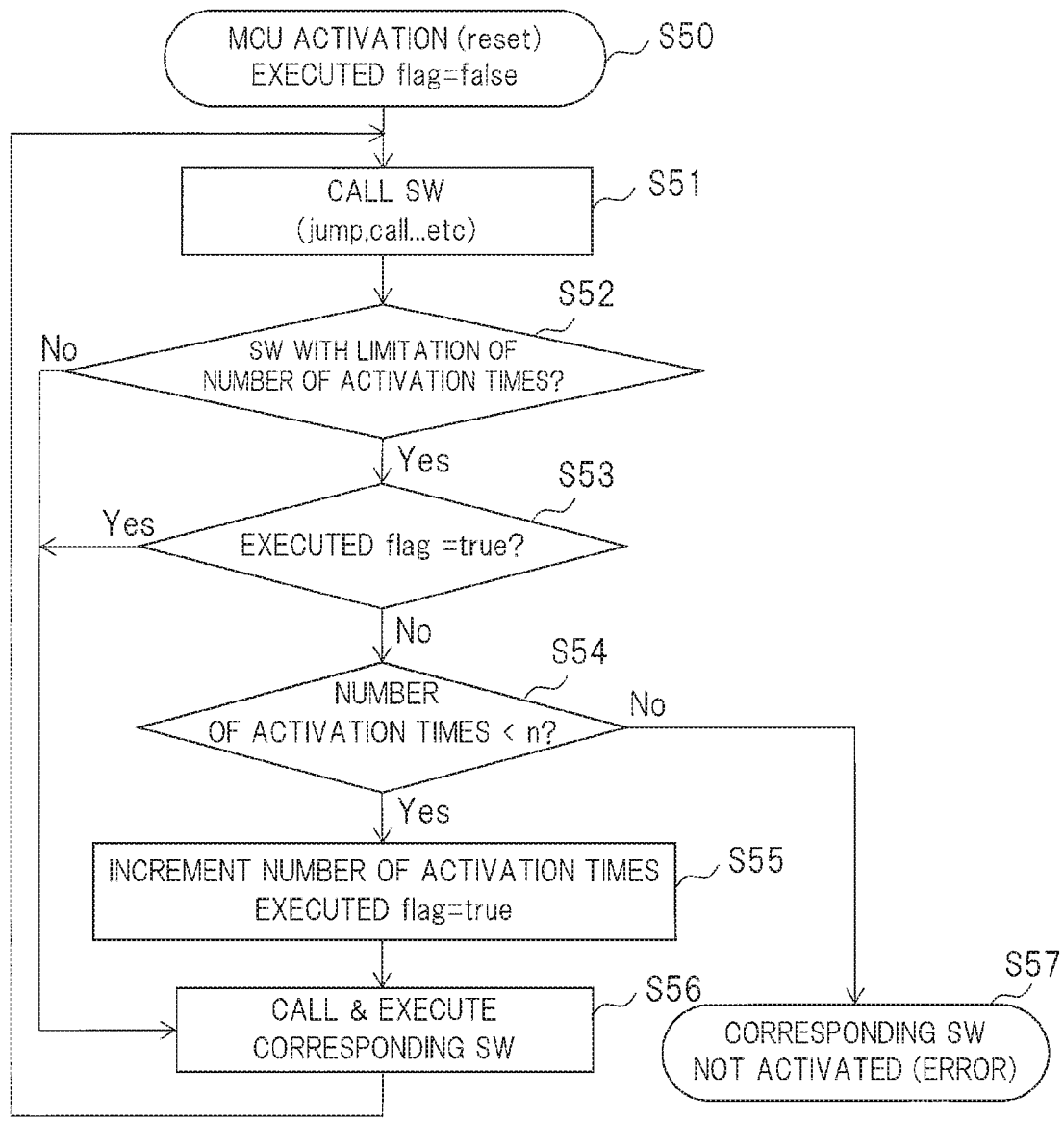

LICENSE MANAGING METHOD, SEMICONDUCTOR DEVICE SUITABLE FOR LICENSE MANAGEMENT AND LICENSE MANAGING SYSTEM

TECHNICAL FIELD

The present invention relates to a license managing method, a semiconductor device suitable for license management and a license managing system, and, more particularly, the present invention related to license management of software.

BACKGROUND ART

As a semiconductor device for executing software, for example, a microprocessor is known. In this case, the microprocessor is provided with a storage section for storing software and a processor for executing the software. Moreover, as an electronic apparatus using a processor for executing the software, various electronic apparatuses such as a personal computer, a smartphone, a television and a camera have been known. In order to allow such semiconductor devices and electronic apparatuses to execute a desired operation, various pieces of software have been proposed. The software is roughly classified into software that requires to acquire license permission for use (hereinafter, referred to also as "fee-charging software") and software that does not require the license permission (hereinafter, referred to also as "charge-free software"). The usage of the fee-charging software that requires the license permission is approved by paying a license fee corresponding to a price of the license.

When the fee-charging software that requires the license permission is distributed, it is necessary to manage the license. For example, Patent Document 1 has described a technique capable of easily managing the license while reducing a load on a network.

RELATED ART DOCUMENT

Patent Document

Patent Document 1: Japanese Patent Application Laid-open Publication No. 2010-218397

SUMMARY OF THE INVENTION

Problems to be Solved by the Invention

When the software (fee-charging software) that requires the license permission is distributed, the distribution is a paid distribution because of collection of the license fee. In this case, it is necessary to surely download the fee-charging software and manage the charging. Moreover, it is desired to reduce user's time and effort required when the fee-charging software is downloaded.

Prior to the present invention, the present inventors have examined a system (hereinafter, referred to also as "license fee collection system") for collecting the license fee when the fee-charging software is distributed. The following is the description about three types of the license fee collection systems that have been examined by the present inventors.

In the first license fee collection system, the number of installable licenses corresponds to pieces of the fee-charging software. In this case, for a software distribution source that distributes the fee-charging software, it becomes difficult to manage as to how many pieces of the fee-charging software are installed in each of devices (semiconductor device, electronic apparatus) in a user who installs the fee-charging software. For this reason, the license management and the collection of the license fee for the fee-charging software to the device become difficult, and there is a concern about failure to collect the license fee. Moreover, the user previously purchases a large number of licenses or pays the license fee corresponding to the number of device products. For this reason, from the viewpoint of the user, wasteful costs occur if the number of licenses is excessive. Furthermore, when the license fee is paid so as to correspond to the number of products, complicated processes occur.

In the second license fee collection system, the software distribution source collects a fixed amount of money as the license fee regardless of the number of licenses. In this case, for a user who installs a small number of pieces of the fee-charging software, the fee is expensive.

In the third license fee collection system, a user introduces a license managing device for managing the number of devices in which the fee-charging software is installed or others, and reports the number of installations to a software distribution source, and also pays a license fee so as to correspond to the number of installations. In this case, particularly when the user mass-produces a large number of devices, the load of the license managing device becomes large. For this reason, a device with high-speed operations is required as the license managing device, so that the license managing device becomes expensive. Moreover, even if a high-speed license managing device is introduced, when the number of mass-produced devices increases, the number of the produced devices is limited by the license management, and therefore, there is a concern about reduction of production efficiency. Furthermore, in the third license fee collection system, it is necessary for the software distribution source to monitor whether or not the license managing device introduced by the user is appropriately operated, and therefore, another load is also applied to the software distribution source.

Patent Document 1 does not describe a technique capable of securely executing the charge management reducing the load of the user, either.

Other object and novel characteristics will be apparent from the description of the present specification and the accompanying drawings.

Means for Solving the Problems

In the present specification, a plurality of means for solving the problems have been disclosed. In the present specification, only typical solving means will be described.

A license managing method including an execution device that executes software and a software storage device that is coupled to the execution device further includes a license storage device that stores license information indicating the number of licenses with permission of the license of the software, and has a license managing process of controlling storage of the downloaded software into the software storage device or the execution by the execution device when the software that requires the license permission is downloaded, based on the license information stored in the license storage section.

Since the storage of the software that requires the license permission into the software storage device or the execution by the execution device is controlled based on the license information stored in the license storage device, the load of the license management on the software distribution source and the user can be reduced.

Effects of the Invention

According to one embodiment, a license managing method capable of reducing the load of the license management can be provided.

BRIEF DESCRIPTIONS OF THE DRAWINGS

FIG. 7 is a flowchart showing an operation of a license managing section according to the second embodiment;

FIG. 8 is a diagram showing a relation between a developing-use processor and a mass-production-use processor;

FIG. 10 is a flowchart showing an operation of a microprocessor according to a fourth embodiment;

FIG. 11 is an explanatory diagram explaining a state of combination of the third embodiment and the fourth embodiment;

BEST MODE FOR CARRYING OUT THE INVENTION

Hereinafter, embodiments of the present invention will be described in detail with reference to the accompanying drawings. Note that the same components are denoted by the same reference symbols throughout all the drawings for describing the embodiment, and the repetitive description thereof will be omitted.

First Embodiment

<Electronic Apparatus>

Figure 1:
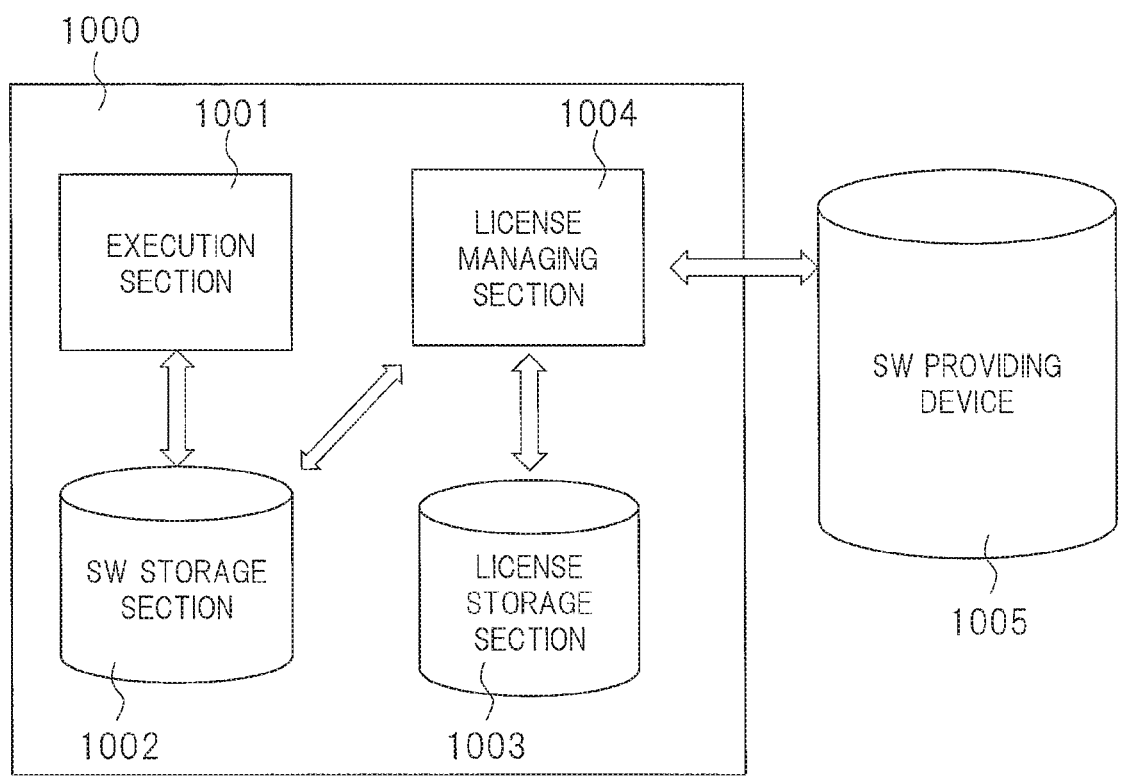
FIG. 1 is a block diagram showing a configuration of an electronic apparatus according to a first embodiment.

FIG. 1 is a block diagram showing a configuration of an electronic apparatus according to a first embodiment. In FIG. 1, reference numeral 1000 represents the electronic apparatus. The electronic apparatus 1000 is an information home electrical appliance such as a personal computer, a smartphone, a printer, a multifunction peripheral (device), a television, and a camera. A processor 1001 is mounted on each of these electronic apparatuses 1000, and the processor 1001 achieves a predetermined function by executing software. In FIG. 1, reference numeral 1002 indicates a software storage section (hereinafter, referred to also as SW) which is coupled to the processor 1001 and which stores the software executed by the processor 1001. In terms of execution of a program, the processor 1001 can be considered to be an execution section.

In FIG. 1, reference numeral 1003 represents a license storage section which stores license information, and reference numeral 1004 represents a license managing section. Moreover, reference numeral 1005 represents a software providing device disposed outside the electronic apparatus 1000. FIG. 1 can be considered to show a license managing system. In this case, the fee-charging software that is a target for the license management is provided from the software providing device 1005 to the electronic apparatus 1000.

The electronic apparatus 1000 includes not only the above-described processor 1001, software storage section 1002, license storage section 1003 and license managing section 1004 but also a plurality of components in accordance with the corresponding electronic apparatus. For example, the smartphone includes a transmitting/receiving section or others related to communication, and the camera includes a control section for autofocus or others. However, in FIG. 1, in order to avoid the complicated drawing, the components except for the above-described processor 1001, software storage section 1002, license storage section 1003 and license managing section 1004 are omitted.

The software providing device 1005 is set in a software distribution source for providing the software, and is connected to the electronic apparatus 1001 through a communication line such as the Internet so as to provide the fee-charging software and/or the charge-free software to a user having the electronic apparatus 1001 through the communication line.

Moreover, the software providing device 1005 may be configured by, for example, an optical disc reproduction device and a storage medium such as an optical disc. In this case, the optical disc reproduction device is set on, for example, the user side having the electronic apparatus 1000, and is connected to the electronic apparatus 1000 by a cable. Furthermore, in the optical disc, for example, a plurality of pieces of the fee-charging software and the charge-free software are stored. The optical disc serving as a storage medium is reproduced by the optical disc reproduction device, so that the fee-charging software and/or the charge-free software is provided from the optical disc reproduction device to the electronic apparatus 1000.

The license information is previously stored in the license storage section 1003. For example, when the user purchases the electronic apparatus 1000, the user pays money including a predetermined license fee as the selling price of the electronic apparatus 1000 to the seller (manufacturer) of the electronic apparatus 1000. That is, the selling price at this time includes the price of the hardware of the electronic apparatus 1000 itself and the predetermined license fee. In this case, the seller of the electronic apparatus 1000 stores the license information corresponding to the above-described predetermined license fee in the license storage section 1003 so as to be supplied to the user. Obviously, the seller may prepare a plurality of types of electronic apparatuses 1000 on which the license storage sections 1003 previously storing different pieces of the license information are mounted, and the user may select and purchase an electronic apparatus. In this case, the license fee is different for each of the electronic apparatuses because the pieces of license information are different from each other.

The license managing section 1004 operates when the user downloads the software from the software providing device 1005 to the software storage section 1002. That is, in response to a request for the download from the user, the license managing section 1004 determines that the software provided from the software providing device 1005 is either the fee-charging software (license-permission software that requires the license permission) or the charge-free software (that does not require the license permission). As the result of the determination, if the software is the charge-free software, the software provided from the software providing device 1005 is stored in the software storage section 1002. The charge-free software stored in the software storage section 1002 is executed by the execution section 1001 so that the operations defined by the charge-free software are executed.

On the other hand, if the license managing section 1004 determines that the software is the fee-charging software, the license managing section 1004 reads the license information from the license storage section 1003, and controls whether or not the provided fee-charging software is stored in the software storage section 1002 based on the read license information.

As described above, the license information corresponding to the license fee is previously stored in the license storage section 1003. In the first embodiment, the number corresponding to the license fee is used as the license information. If the number indicated by the read license information, for example, one or larger, the license managing section 1004 stores the provided fee-charging software in the software storage section 1002. Moreover, when the fee-charging software is stored in the software storage section 1002, the license managing section 1004 decrements the number indicated by the license information by, for example, 1, and stores the number, which has been obtained by the decrement, in the license storage section 1003 as the license information. The fee-charging software stored in the software storage section 1002 can be executed by the execution section 1001.

On the other hand, if the number indicated by the license information is 0, the license managing section 1004 does not store the provided fee-charging software in the software storage section 1002. Thus, if the previously-paid license fee is insufficient, the execution of the fee-charging software is prohibited. From another viewpoint, the fee-charging software can be prevented from being illegally executed without paying the price, and the failure to collect the license fee by the software distribution source can be prevented.

After the seller stores the license information, change in the license storage section 1003 can be achieved by only the license managing section 1004. Although not particularly limited, in FIG. 1, the license managing section 1004 is configured by a processor that is different from the processor 1001. In this case, the functions of the license managing section 1004 are achieved by software executed by the processor which configures the license managing section 1004. Obviously, the processor 1001 may achieve both of the function of the execution section and the function of the license managing section 1004.

<Semiconductor Device>

Figure 2:
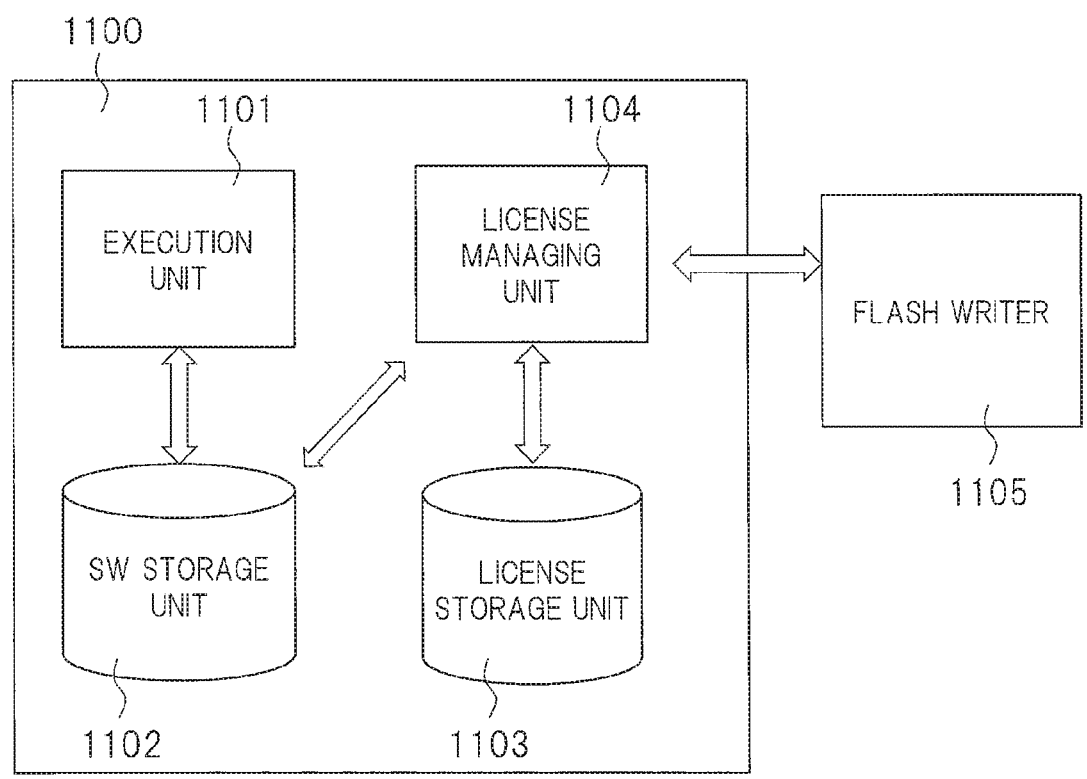
FIG. 2 is a block diagram showing a configuration of a semiconductor device according to the first embodiment.

FIG. 2 is a block diagram showing a configuration of a semiconductor device according to the first embodiment. In the drawing, a microprocessor (hereinafter, referred to also as microprocessor 1100) is shown as a semiconductor device 1100. The microprocessor 1100 includes a processor (central processor unit, hereinafter, referred to also as "execution unit") 1101 that executes the software, a software storage unit 1102, a license storage unit 1103 and a license managing unit 1104. Although omitted in FIG. 2 in order to avoid the complicated drawing, the microprocessor 1100 includes not only the above-described processor (execution unit) 1101, software storage unit 1102, license storage unit 1103 and license managing unit 1104 but also circuit units.

For example, in addition to the above-described units, the microprocessor 1100 also includes a peripheral circuit unit that transmits/receives signals to/from an outside of the microprocessor 1100.

Although not particularly limited, the above-described respective units are formed on one semiconductor chip by using a publicly-known semiconductor manufacturing technique, and are sealed in one package. When the seller (manufacturer) provides (sells) the microprocessor 1100 to a user, the units are sold in a packaged state. Obviously, the units may be sold in terms of the semiconductor chip without being packaged.

The software storage unit 1102 is coupled to the execution unit 1101, and stores the software. The execution unit 1101 reads the software from the software storage unit 1102, and executes the read software. The software is executed by the execution unit 1101, so that the microprocessor 1100 executes the predetermined operations defined by the software.

As similar to the license storage section 1003 shown in FIG. 1, the license information is previously stored in the license storage unit 1103. That is, before the microprocessor 1100 is provided from the seller (manufacturer) to the user, the seller stores the license information in the license storage unit 1103. As similar to the explanation in FIG. 1, when purchasing the microprocessor 1100, the user pays the selling price of the microprocessor 1100 including a predetermined license fee to the seller. Therefore, the selling price at this time includes the hardware price of the microprocessor 1100 itself and the predetermined license fee. The seller of the microprocessor 1100 stores the license information corresponding to the above-described predetermined license fee in the license storage unit 1103, and provides it to the user.

As similar to the license managing section 1004 shown in FIG. 1, based on the license information from the license storage unit 1103, the license managing unit 1104 performs control as to whether or not the software provided from the outside of the microprocessor 1100 is stored in the software storage unit 1102. It is determined that the software provided from the outside of the microprocessor 1100 is either the fee-charging software or the charge-free software. As a result of the determination, if the provided software is the charge-free software, the license managing unit 1104 stores the provided charge-free software in the software storage unit 1102 as similar to the license managing section 1004 (FIG. 1). In this case, the execution unit 1101 reads the charge-free software from the software storage unit 1102, and executes the software.

On the other hand, if it is determined that the provided software is the fee-charging software, the license managing unit 1104 reads the license information from the license storage unit 1103, and controls as to whether or not the provided fee-charging software is stored in the software storage unit 1102 based on the read license information.

Also here, the explanation will be made in an assumption that the number corresponding to the license fee is indicated by the license information. If the number indicated by the read license information is, for example, 1 or larger, the license managing unit 1004 stores the provided fee-charging software in the software storage unit 1102. Moreover, when the fee-charging software is stored in the software storage unit 1102, the license managing unit 1104 decrements the number indicated by the license information by, for example, 1, and stores the number, which is obtained by the decrement as the license information, in the license storage unit 1103. The fee-charging software stored in the software storage unit 1102 can be executed by the execution unit 1101.

On the other hand, if the number indicated by the license information is 0, the license managing unit 1104 does not store the provided fee-charging software in the software storage unit 1102. Thus, if the previously-paid license fee is insufficient, the execution of the fee-charging software is prohibited. From another viewpoint, the fee-charging software can be prevented from being illegally executed without paying the price, and the failure to collect the license fee by the software distribution source can be prevented.

Although not particularly limited, in FIG. 2, the software storage unit 1102 included in the microprocessor 1101 is configured by a flash memory that is an electrically-rewritable nonvolatile memory. Therefore, as a software providing device for providing the software to the microprocessor 1100, a flash writer 1105 is used. Obviously, the software providing device is not limited to the flash writer 1105. For example, a storage medium such as a USB (Universal Serial Bus) memory and an SD memory card may be applicable. Moreover, the software providing device using the optical disc reproduction device and the optical disc as described in FIG. 1 may be applicable. In any of the cases, the software providing device stores the fee-charging software and/or the charge-free software, and provides the software to the microprocessor 1100. Furthermore, as described in FIG. 1, the software may be provided to the microprocessor 1100 through a communication line.

Furthermore, the license storage unit 1103 shown in FIG. 2 is also configured by a flash memory. The example of the software storage unit 1102 and the license storage unit 1103 each configured by a flash memory has been described. However, the configuration is not limited to this, and a volatile memory such as a static-type memory may be applicable. However, when the license storage unit 1103 is configured by the volatile memory, data is backed up by a battery or others so as to retain the license information even if a power-supply voltage is not supplied thereto.

After the seller (manufacturer) stores the license information in the license storage unit 1103, the license information can be changed by only the license managing unit 1104. Although not particularly limited, in FIG. 2, the license managing unit 1104 is configured by an execution unit different from the execution unit 1101. In this case, the function of the license managing unit 1104 is achieved by the software executed by the execution unit forming the managing unit 1104. Obviously, the execution unit 1001 may achieve both of the function of the execution unit and the function of the license managing unit 1104.

With reference to FIG. 1 and FIG. 2, the explanation has been made about the electronic apparatus 1000 and the semiconductor device 1100 according to the first embodiment in the case of the storage of the fee-charging software provided from the outside in the software storage units 1002 and 1102. That is, the case of the download of the provided fee-charging software to the software storage section 1002 (storage unit 1102) has been explained. The software stored in the software storage section 1002 (storage unit 1102) by the download can be executed by the execution section 1001 (execution unit 1101). Therefore, in the present specification, the download means not only the storage of the software in the software storage section 1002 (storage unit 1102) but also a state in which the software can be executed in a broad sense.

Moreover, the installation means a state in which the software can be executed by the execution section 1001 (execution unit 1100). A term opposite to the installation is a term "uninstallation". The uninstallation means a state in which the execution of the software by the execution section 1001 (execution unit 1100) is impossible.

Every time the fee-charging software is provided (downloaded), the license managing section 1004 (license managing unit 1104) decrements the license information as described above, and updates the license information stored in the license storage section 1003 (license storage unit 1103). That is, every time the fee-charging software is downloaded, the previously-paid license fee is reduced. When the previously-paid license fee is completely spent, the download of the fee-charging software is prohibited.

When the execution of the downloaded fee-charging software is made impossible, that is, when the uninstallation state is caused, the license managing section 1004 (license managing unit 1104) may change or may not update the license information although explained later in detail.

<Operations of License Managing Unit 1104>

Figure 3:
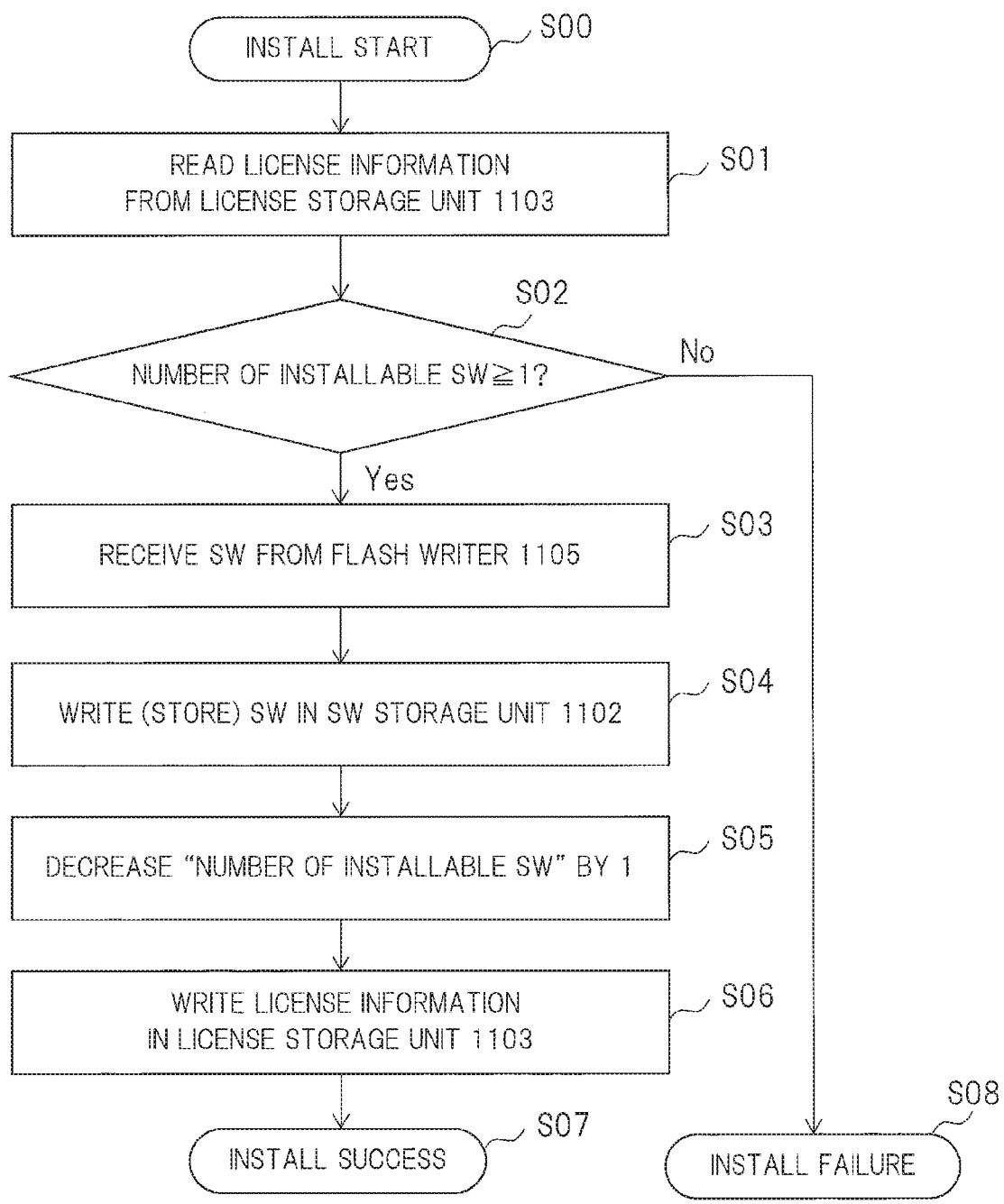
FIG. 3 is a flowchart showing operations of a license managing unit according to the first embodiment.

FIG. 3 is a flowchart showing operations of the license managing unit 1104 according to the first embodiment.

First, the user instructs the license managing unit 1104 to install the software in step S00. At this time, the user specifies the software to be installed.

When the software defined by the user is the fee-charging software, the license managing unit 1104 reads the license information from the license storage unit 1103 in step S01. In the first embodiment, the number corresponding to the license fee is used as the license information. In other words, the license information indicates the number of installable times of the fee-charging software (SW). In step S02, the license managing unit 1104 determines whether or not the number of installable times of the fee-charging software (in the drawing, described as the number of SW installable times) indicated by the license information is 1 or larger. If the number of installable times of the fee-charging software is smaller than 1 (for example, 0), the license managing unit 1104 executes step S08. In step S08, the license managing unit 1104 notifies the user, for example, of the failure of the installation.

On the other hand, if the license managing unit 1104 determines that the number of installable times of the fee-charging software is 1 or larger in step S02, the license managing unit 1104 executes step S03 next. In step S03, the software specified by the user is received from the flash writer 1105. The license managing unit 1104 provides the received software to the software storage unit (flash memory) 1102 in step S04, and writes (stores) it in the software storage unit 1102.

Next, in step S05, the license managing unit 1104 decrements the number of installable times of the fee-charging software by 1, and updates the reduced number of installable times of the fee-charging software as the license information. Then, the license managing unit 1104 provides the updated license information to the license storage unit 1103, and writes (stores) the license information therein. Thus, the license information stored in the license storage unit 1103 is updated.

Lastly, in step S07, the license managing unit 1104 notifies the user of the success of the installation.

Every time the fee-charging software is installed into the microprocessor 1100, the above-described steps S00 to S07 are repeated. By repeating the processes, the number of installable times of the fee-charging software indicated by the license information is decremented, and finally reaches to be smaller than 1 (for example, 0). When the number of installable times of the fee-charging software becomes smaller than 1, the license managing unit 1104 executes step S08 so as to notify the user of the failure of the installation.

That is, the fee-charging software can be stored in the software storage unit 1103 until the number of installable times of the fee-charging software set in accordance with the previously-paid license fee at the time of purchasing the semiconductor device has been reached. Since the software stored in the software storage unit 1103 can be executed by the execution unit 1101, pieces of the fee-charging software, the number of which corresponds to the license fee paid at the time of the purchase, can be executed.

The case in which the software to be installed is the fee-charging software has been explained. However, the software to be installed is the charge-free software in some cases. Therefore, when the fee-charging software is installed in the microprocessor 1100, the user may instruct the license managing unit 1104 to execute the steps shown in FIG. 3.

Figure 23:
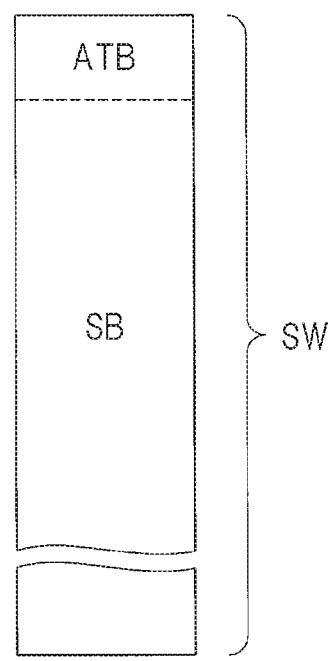
FIG. 23 is a diagram showing a configuration of software.

Moreover, as shown in FIG. 23, an attribute information portion ATB may be added to a software portion SB to be installed so that the software portion SB and the attribute information portion ATB form the software. In this case, each of pieces of the fee-charging software to be stored in the software providing device 1005 and the flash writer 1105 explained in FIG. 1 and FIG. 2 has the software portion SB to be installed and the attribute information portion ATB as shown in FIG. 23. The attribute information, which indicates whether or not the software portion SB is the fee-charging software, is stored in the attribute information portion ATB.

When the attribute information portion ATB is added as described above, the license managing unit 1104 receives the software specified by the user from the flash writer 1105 in, for example, step S00 shown in FIG. 3. In step S00, the license managing unit 1104 determines whether or not the attribute information indicating the fee-charging software is stored in the attribute information portion ATB. When the attribute information indicates the fee-charging software, steps S01, S02, and S04 to S08 shown in FIG. 3 are executed. In this case, since the license managing unit 1104 has received the software portion SB in step S00, it is not necessary to execute step S03.

On the other hand, in step S00, when the attribute information stored in the attribute information portion ATB indicates the charge-free software, or when the attribute information portion ATB is not included in the software SW, it is determined that the software to be installed is the charge-free software, and the license managing unit 1104 does not execute steps S01 to S08 shown in FIG. 3.

<Uninstallation>

Next, explanation will be made about the operation of the license managing unit 1104 in the case of the uninstallation of the fee-charging software after the installation of the fee-charging software. Here, explanation will be made about an example with change and an example without the change in the number of installable times of the fee-charging software indicated by the license information at the time of the uninstallation of the fee-charging software. Each of the case with the change and the case without the change in the number of installable times of the fee-charging software has effects, and therefore, either of the examples may be adopted depending on the desired effects.

Figure 4:
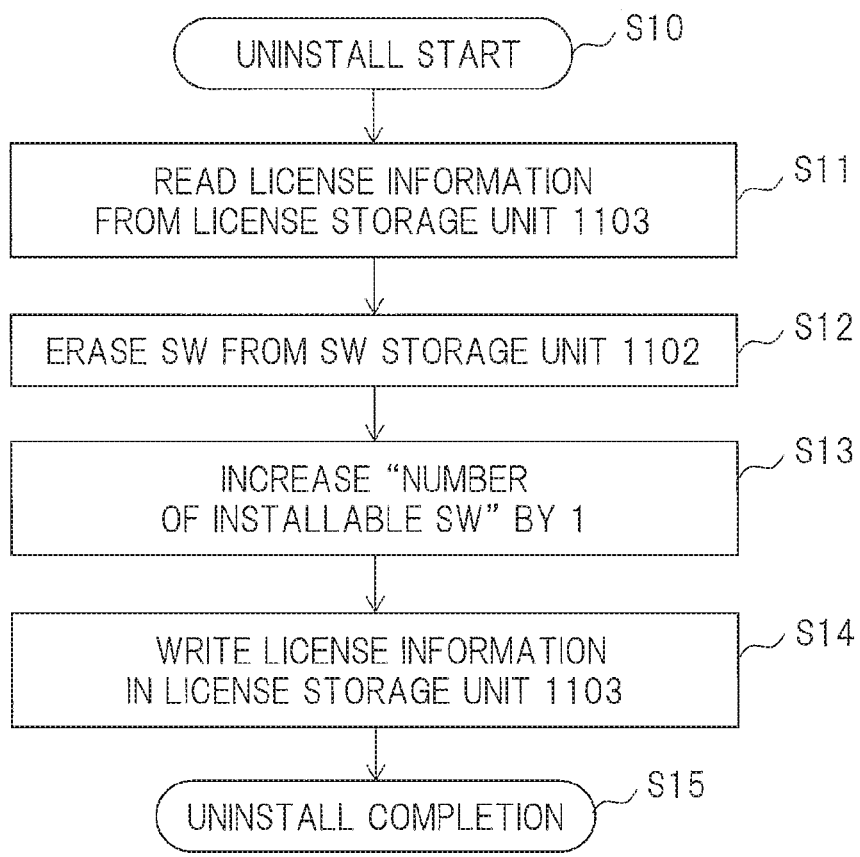
FIG. 4 is a flowchart showing an uninstalling operation of the license managing unit according to the first embodiment.

First, with reference to FIG. 4, the example with the change in the number of installable times of the fee-charging software will be explained. FIG. 4 is a flowchart showing the operation of the license managing unit 1104 in the case of the uninstallation of the fee-charging software.

In step S10, the user specifies the fee-charging software to be uninstalled, and instructs the license managing unit 1104 to uninstall the software. Thus, the uninstalling process is started. In step S11, the license managing unit 1104 reads the license information from the license storage unit 1103. Next, in step S12, from the software storage unit 1102, the license managing unit 1104 erases the software specified to be uninstalled. In the next step S13, the number of installable times of the fee-charging software indicated by the read license information in step S11 is incremented by 1, so that the number of installable times of the fee-charging software is updated.

In step S14, the license managing unit 1104 writes the license information indicating the updated number of installable times of the fee-charging software in the license storage unit 1103, and the uninstalling process is completed in step S15.

By increasing the number of installable times of the fee-charging software when the fee-charging software is uninstalled as described above, the desired fee-charging software can be re-installed without reducing the license fee even if the fee-charging software is erroneously installed.

Figure 5:
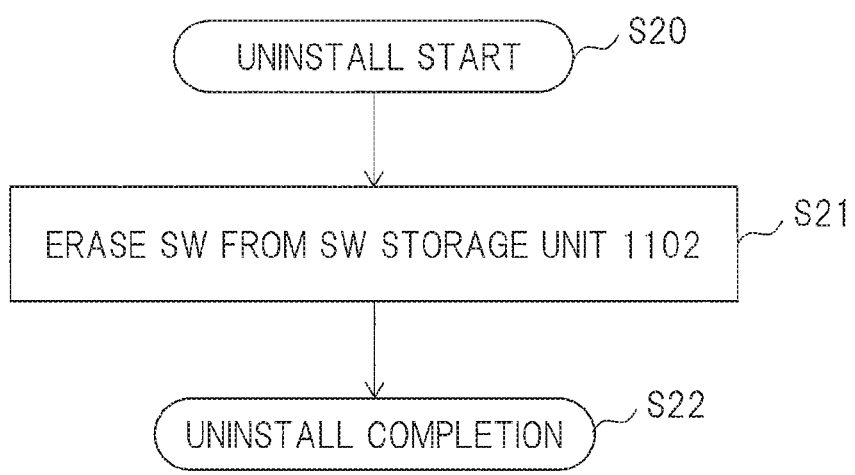
FIG. 5 is a flowchart showing another uninstalling operation of the license managing unit according to the first embodiment.

Next, with reference to FIG. 5, the example in which the number of installable times of the fee-charging software is not updated when the software is uninstalled will be explained. FIG. 5 is a flowchart showing the operation of the license managing unit 1104 in the case of the uninstallation of the fee-charging software.

As similar to step S10 of FIG. 4, the user specifies the fee-charging software to be uninstalled in step S20, and gives the instruction for the uninstallation, so that the uninstalling operation is started.

When receiving the instruction for the uninstallation, the license managing unit 1104 erases the defined fee-charging software from the software storage unit 1102. Thereafter, in step S22, the license managing unit 1104 completes the uninstalling operation. In this case, the license managing unit 1104 does not read the license information from the license storage unit 1103. For this reason, the license information is not updated and maintained. Thus, the number of installable times of the fee-charging software indicated by the license information is neither incremented nor decremented but maintained.

In the example of FIG. 5, when the instruction for uninstalling the fee-charging software is issued, only the uninstalling operation is performed. Thus, the fee-charging software can be prevented from infinitely being installed.

In FIG. 4 and FIG. 5, as the uninstalling operation, the example for erasing the software from the software storage unit 1102 has been shown. However, the uninstalling operation is not limited to this operation. Moreover, the erasing operation also includes an operation that rewrites a predetermined state.

The present embodiment has explained the example in which the license information indicates the number of installable times of the fee-charging software. However, the present invention is not limited to this. For example, the license information may indicate an installable point of the fee-charging software or an installable storage capacity.

Moreover, the present embodiment has described the example in which the number of installable times of the fee-charging software indicated by the license information is decremented by 1 every time the fee-charging software is installed. However, the present invention is not limited to this. For example, the number may be decremented by two or larger every time the software is installed. Moreover, the decrement number may be changed depending on the price of the fee-charging software to be installed. In this case, for example, the decrement number corresponding to the price of the fee-charging software may be stored in the attribute information portion ATB explained in FIG. 23. In this case, when the number of installable times of the fee-charging software is decremented, the license managing unit 1104 may decrement the license information by the decrement number stored in the attribute information portion ATB.

Also when the license information indicates the installable points of the fee-charging software, the license information may be decremented by one point or two or larger points every time the installing operation is performed, or by the number of points depending on the price of the fee-charging software.

The same goes for the case in which the license information indicates the installable storage capacity of the fee-charging software. In this case, the installable storage capacity of the fee-charging software indicated by the license information indicates the storable capacity of the software storage unit 1102. That is, the installable capacity indicates the storage capacity capable of storing the fee-charging software among the storage capacity of the software storage unit 1102. When the license managing unit 1104 reads the fee-charging software to be installed from the flash writer 1105, the capacity of the fee-charging software can be confirmed, and therefore, it can be determined whether or not the fee-charging software can be installed from the installable capacity of the fee-charging software indicated by the license information and the confirmed capacity of the fee-charging software. Moreover, a storage capacity, which is obtained by decrementing the installable capacity by the confirmed capacity of the fee-charging software, can be updated as the license information.

The license information can be considered to be the information indicating the number of the installable licenses of the fee-charging software. In this case, in the present embodiment, the number of licenses is set not to the software but to the semiconductor device 1100. For this reason, the fee-charging software to be installed is optional regardless of the type, and the different types of the fee-charging software can be installed until the number has reached the number of licenses indicated by the license information.

In FIG. 2, the semiconductor device 1101 includes the license storage unit 1103 and the license managing unit 1104. The license information indicating the number of the installable licenses is previously stored in the license managing unit 1104, and is provided to the semiconductor device 1100. Thus, a user who has purchased the semiconductor device 1100 can install the pieces of fee-charging software in the semiconductor device 1100 until the number of install times reaches the number of the licenses indicated by the license information. That is, inside the semiconductor device 1100, the licenses are managed. Thus, the user can manage the licenses without introducing the license managing device, so that the load of the user can be reduced. Moreover, since it is unnecessary to monitor the license managing device, the load of the software distribution source can be reduced. In other words, the licenses can be managed without losing the convenience of the user. That is, the semiconductor device 1100 suitable for the license management can be provided.

Second Embodiment

Figure 6:
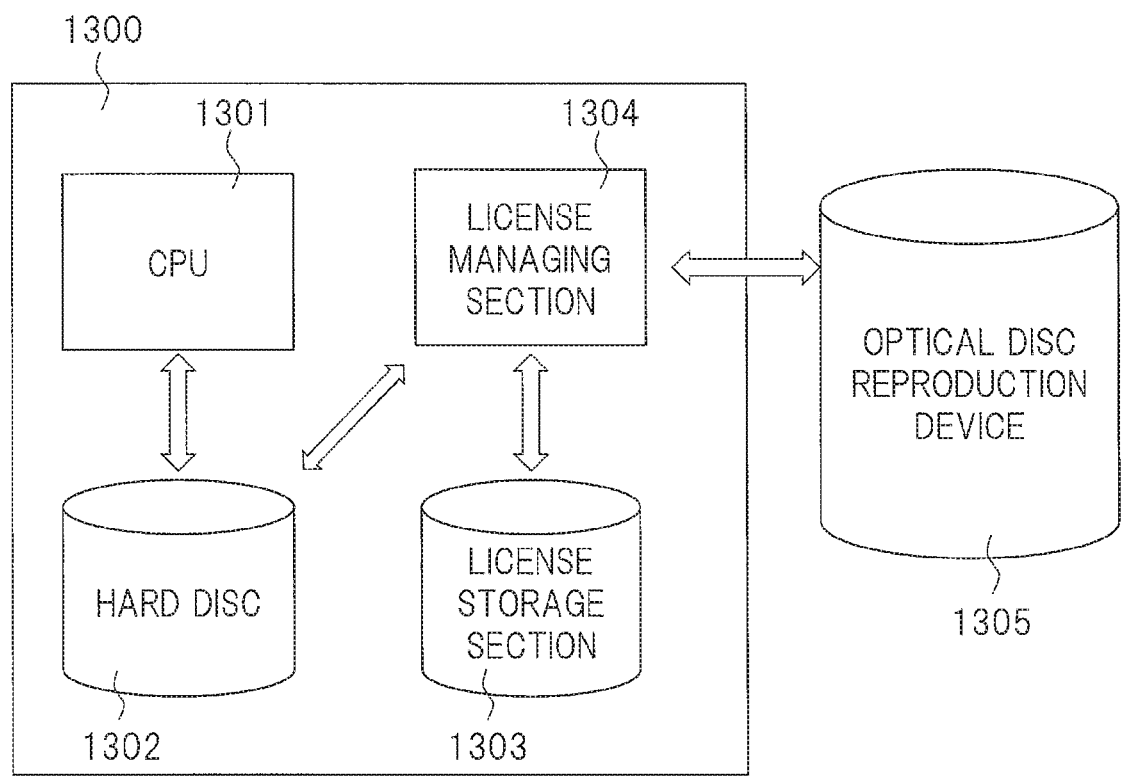
FIG. 6 is a block diagram showing a configuration of an electronic apparatus according to a second embodiment.

FIG. 6 is a block diagram showing a configuration of an electronic apparatus according to a second embodiment. In the second embodiment, a personal computer is shown as the electronic apparatus. Since the configuration of the electronic apparatus according to the first embodiment has been explained above with reference to FIG. 1, differences from the electronic apparatus shown in FIG. 1 will be mainly described. FIG. 6 can be also considered to show the license managing system. Also here, the fee-charging software that is a target of the license management is provided from the software providing device to the electronic apparatus (personal computer).

<Configuration of Personal Computer>

In FIG. 6, reference numeral 1300 indicates the personal computer. To the personal computer 1300, peripheral devices such as an optical disc reproduction device such as a CD-ROM, a display device such as a display, an input device such as a keyboard, a communication device such as wireless communication are connected. However, in the drawing, the peripheral devices are omitted except for the optical disc reproduction device 1305 that is required for the explanation. Here, the optical disc reproduction device (CD-ROM) 1305 is used while being mounted with a storage medium such as an optical disc. A plurality of types of pieces of the software are stored in the optical disc, and the optical disc is reproduced by the optical disc reproduction device 1305, so that the software stored in the optical disc is provided to the personal computer 1300. Therefore, the software providing device 1005 shown in FIG. 1 can be considered to be configured by the optical disc reproduction device 1305 and the optical disc.

The personal computer 1300 includes a processor (CPU) 1301, a hard disc 1302, a license storage section 1303 and a license managing section 1304. In addition to them, the personal computer 1300 includes, for example, a peripheral section installed between the peripheral devices and the processor 1301 although the peripheral section is omitted in FIG. 6. Moreover, the personal computer 1300 includes, for example, a volatile memory for operation used when the processor 1301 executes the software. The explanation in FIG. 6 will be made in the assumption that the volatile memory is embedded in the processor 1301.

When the personal computer 1300 is manufactured or sold, the manufacturer or seller stores the predetermined license information in the license storage section 1303, and manufactures or sells the personal computer. The license information stored at this time indicates the number of installable times of the fee-charging software. The number of installable times of the fee-charging software corresponding to the number of licenses desired by the user who is going to buy the personal computer 1300 is stored in the license storage section 1303 as the license information by the manufacturer or seller. In this case, a license fee corresponding to the number of licenses desired by the user is added to a price of a hardware (main body) of the personal computer 1300, and the user pays money for the purchase as the manufacturing or selling price of the personal computer 1300.

The processor 1301 is coupled to the hard disc 1302, reads the software from the hard disc 1302, and executes the read software. By the execution of this software, the personal computer 1300 achieves functions desired by the user.

When the fee-charging software is provided from the optical disc reproduction device 1305, the license managing section 1304 reads the license information from the license storage section 1303, and controls the storage of the fee-charging software into the hard disc 1302 based on the read license information.

That is, when the number of installable times of the fee-charging software indicated by the license information is equal to or larger than the determined number of the fee-charging software to be installed, the license managing section 1304 stores the provided fee-charging software in the hard disc 1302. Moreover, at this time, the number of installable times indicated by the license information is decremented by the determined number of the fee-charging software, and the number of installable times obtained by the decrement is stored in the license storage section 1303 as the license information. On the other hand, if the determined number of the fee-charging software exceeds the number of installable times indicated by the license information, the license managing section 1304 does not store the provided fee-charging software in the hard disc 1302. Moreover, at this time, the number of installable times is not changed but maintained.

The fee-charging software stored in the hard disc is read and executed by the processor 1301. Thus, the personal computer 1300 operates in accordance with the fee-charging software.

The determined number of the fee-charging software may be set to a constant value such as 1 as similar to the first embodiment for a plurality of types of the fee-charging software as similar to the first embodiment, or to a different value for each type of the fee-charging software. For example, for each type of the fee-charging software to be installed, the determined number may be set to a value in proportion to the price or the size (capacity) of the fee-charging software.

The license storage section 1303 is configured to be changeable by only the license managing section 1304 after the license information is stored by the manufacturer or the seller.

The license managing section 1304 is configured by, for example, a processor that is different from the processor 1301. In this case, the processor forming the license managing section 1304 operates in accordance with the software. However, the present invention is not limited to this configuration. For example, the processor 1301 may execute the software from the hard disc 1302 while achieving the function of the license managing section 1304.

<Operation of License Managing Section 1304>

FIG. 7 is a flowchart showing the operation of the license managing section 1304. Here, explanations will be made while exemplifying a case in which the determined value of the fee-charging software is set to 1.

First, in step S30, the user specifies the fee-charging software to be installed by using a keyboard (not shown) or others, and designates the installation of the fee-charging software. The designation and instruction from the keyboard are identified by the processor 1301, and the processor 1301 operates the license managing section 1304 and the optical disc reproduction device 1305. Thus, in step S30, an installing operation is started.

By starting the operation, the license managing section 1304 reads the license information from the license storage section 1303 in step S31. Next, in step S32, the license managing section 1304 determines whether or not the number of installable times of the fee-charging software indicated by the read license information is the determined number or larger. Here, since the determined number is set to 1, it is determined whether or not the number of installable times is 1 or larger.

When, in step S32, it is determined that the number of installable times of the fee-charging software indicated by the license information is smaller than the determined number (1), the license managing section 1304 executes step S38 next. In step S38, the license managing section 1304 notifies the processor 1301 of the failure of the installation. In response to this notification, the processor 1301 causes, for example, a display device to display the failure of the installation to end the installation operation.

On the other hand, if it is determined that the number of installable times of the fee-charging software indicated by the license information is the determined number (1) or larger in step S32, the license managing section 1304 executes step S33 next. In step S33, the fee-charging software is read from the optical disc reproduction device 1305. In step S34, the license managing section 1304 writes (stores) the fee-charging software, that has been read in step S33, in the hard disc 1302.

Thereafter, in step S35, the license managing section 1304 decrements the number of installable times of the fee-charging software indicated by the license information by the determined number. In the example of FIG. 7, the number is decremented by the determined number 1. In step S36 continued from step S35, the license managing section 1304 writes (stores) the number of installable times of the fee-charging software obtained by the decrement in step S35 in the license storage section 1303 as the license information. Thereafter, in step S37, the license managing section 1304 notifies the processor 1301 of the success of the installation. When receiving this notification, the processor 1301 causes the display device to display the success of the installation to end the installation operation.

Every time the fee-charging software is installed, steps shown in FIG. 7 are executed. Every time the steps are executed, the number of installable times of the fee-charging software indicated by the license information stored in the license storage section 1303 is decremented. The fee-charging software is written in the hard disc 1303 until the number of writing times reaches the number of installable times of the fee-charging software indicated by the stored license information at the time of the purchase by the user. That is, the processor 1301 can execute the pieces of the fee-charging software until the number of execution times reaches the previously-stored number of installable times of the fee-charging software indicated by the license information. On the other hand, when the number exceeds the previously-stored number of installable times of the fee-charging software indicated by the license information, step S38 shown in FIG. 7 is executed, so that the fee-charging software is not written in the hard disc 1303, and cannot be executed by the processor 1301.

As similar to the first embodiment, also in the second embodiment, an installable point of the fee-charging software or an installable storage capacity thereof may be indicated as the license information, and the license information may be considered to indicate the number of installable licenses. When the license information is indicated by the point, the points corresponding to the number of licenses are considered to be indicated by the license information. Moreover, when the license information is indicated by the storage capacity, the storage capacity corresponding to the number of licenses can be considered to be indicated by the license information.

Moreover, as similar to the description in the first embodiment, the configuration of the fee-charging software may be configured as shown in FIG. 23. When the attribute information indicating that the software is the fee-charging software is stored in the attribute information portion ATB shown in FIG. 23, note that it is only necessary for the user to specify the software to be installed at the time of start of the installation (step S30 of FIG. 7).

Moreover, as similar to the description in the first embodiment, when the fee-charging software has been uninstalled, the license information may be updated as explained in FIG. 4, or maintained as explained in FIG. 5.

Third Embodiment

In FIG. 1 and FIG. 6, the electronic apparatus in which the processor 1001 (execution unit 1301) is embedded has been explained. However, the electronic apparatus can be configured and provided by use of a microprocessor (for example, microprocessor 1100 of FIG. 2) having a storage unit for storing the software and a processor. In this case, for example, the user purchases the microprocessor from the seller (manufacturer), and embeds this in the electronic apparatus, and the user provides the electronic apparatus in which the microcomputer is embedded.

When the electronic apparatus in which the microprocessor is embedded is provided, stages required for the provision are roughly classified into a developing stage and a mass-production stage. The software to be installed into the microprocessor is developed in the developing stage, and the software developed in the developing stage is installed into each of a plurality of microprocessors in the mass-production stage. Such a microprocessor in which the software developed in the developing stage has been installed is embedded into the electronic apparatus and is provided. For this reason, in the mass-production stage, it is necessary to install the software only once in principle.

On the other hand, in the developing stage, the software is repeatedly installed, uninstalled, and re-installed to the microprocessor. That is, the same software is repeatedly installed, uninstalled, and re-installed in some cases. For example, an example using the microprocessor 1100 shown in FIG. 2 will be explained as follows.

Each of the fee-charging software and the charge-free software is installed in the software storage unit 1102. Thereafter, as a result of developing the installed charge-free software, the size (capacity) of the charge-free software becomes adversely large, and therefore, it is necessary to move the already-installed fee-charging software to another region in the software storage unit 1102. In this case, after the fee-charging software is installed, the fee-charging software is uninstalled, and is further installed (re-installed). Moreover, in another example, after the fee-charging software is installed at the beginning of the developing stage, this fee-charging software becomes unnecessary through the course of the development, and therefore, is uninstalled. Then, in some cases, through the further course of the development, it becomes eventually necessary to install this fee-charging software, and therefore, this fee-charging software is (re-installed) installed. Also in this case, the same fee-charging software is installed, uninstalled, and then, further re-installed.

For this reason, it is proposed that the seller (manufacturer) for providing a microprocessor provides the user who develops an electronic apparatus with a microprocessor capable of freely rewriting the software. However, when the microprocessor capable of freely rewriting the software as described above is provided, software that has been copied without permission can be undesirably installed in the microprocessor in the mass-production stage.

As countermeasure against this problem, it is proposed for the seller (manufacturer) to separately provide a microprocessor for use in the developing stage (hereinafter, referred to also as "developing-use microprocessor") and a microprocessor for use in the mass-production stage (hereinafter, referred to also as "mass-production-use microprocessor"). In this case, the developing-use microprocessor is designed to have the same functions as those of the mass-production-use microprocessor and further have additional functions suitable for the development. Moreover, the software can be designed to be freely rewritten in the developing-use microprocessor, and the software is designed not to be freely rewritten or to limit the free rewriting in the mass-production-use microprocessor. Note that the rewriting here means that, after the software is installed, the same software is installed again.

In this case, switching between the developing-use microprocessor and the mass-production-use microprocessor is designed to be difficult after the seller (manufacturer) has provided the microprocessors. As methods for the switching, for example, the following methods (1) to (6) are proposed.

(1) A nonvolatile memory to which data can be written only once is provided to the microprocessor. The microprocessor is functioned as, for example, the developing-use microprocessor if the data is written into this nonvolatile memory, and it is functioned as the mass-production-use microprocessor if the data is not written.

(2) When the nonvolatile memory is provided to the microprocessor, a special region to which data can be written by only a special method is set in the nonvolatile memory. The microprocessor is functioned as, for example, the developing-use microprocessor if the data is written into the special region, and it is functioned as the mass-production-use microprocessor if the data is not written therein. As the special method in this case, a method is proposed, the method providing a semiconductor chip with a terminal that is not connected to the outside in a state in which the semiconductor chip is packaged, and being capable of the writing only when a specific code is supplied to this terminal.

(3) A metal switch is provided in the microprocessor. In a manufacturing process for manufacturing the microprocessor, the metal switch is turned on or off. In this case, for example, the microprocessor in which the metal switch is turned on is functioned as the developing-use microprocessor, and the microprocessor in which the metal switch is turned off is functioned as the mass-production-use microprocessor.

(4) The nonvolatile memory embedded in the microprocessor is made different between the developing-use microprocessor and the mass-production-use microprocessor.

(5) By changing the connection between a semiconductor chip of a microprocessor and a lead that protrudes from a package for sealing the semiconductor chip, the developing-use microprocessor and the mass-production-use microprocessor are switched from each other.

(6) By making a difference in the package between the developing-use microprocessor and the mass-production-use microprocessor, the developing-use microprocessor and the mass-production-use microprocessor are switched from each other.

FIG. 8 is a diagram showing a relation between the developing-use microprocessor and the mass-production-use microprocessor that are switched by such methods. A left side of FIG. 8 shows the developing-use microprocessor, and a right side thereof shows the mass-production-use microprocessor. In the developing-use microprocessor, the software can be freely rewritten. On the other hand, in the mass-production-use microprocessor, the writing of the software is limited. For example, the mass-production-use microprocessor is designed so that the installation is possible but the re-installation is impossible. The developing-use microprocessor includes the functions of the mass-production-use microprocessor, and also includes additional functions for the development. For this reason, a hardware price of the developing-use microprocessor becomes more expensive by a price (α) of the additional functions than a hardware price (fixed price) of the mass-production-use microprocessor. Note that the price described here does not include the license fee. That is, the price indicates a price of the main body (hardware) of the microprocessor.

In the present third embodiment, rewriting limit information is formed by the above-described methods based on information indicating either the developing-use microprocessor or the mass-production-use microprocessor. For example, when the microprocessors are switched by, for example, the above-described method (1), a value determined based on the output from the nonvolatile memory in which the software can be written only once is used as the rewriting limit information.

Moreover, in the third embodiment, history information of the fee-charging software that has been installed in the past is stored in the license storage unit 1103 of FIG. 2 shown in the first embodiment. The history information described here is, for example, a unique number ID that specifies the installed fee-charging software. If the fee-charging software has no unique number ID that specifies the fee-charging software, information of the unique number ID that specifies the fee-charging software is stored in the attribute information portion ATB explained in FIG. 23.

In the third embodiment, the license managing unit 1104 is further changed from FIG. 2 of the first embodiment. That is, when the installed fee-charging software is uninstalled and further re-installed, the license managing unit 1104 according to the third embodiment controls the storage of the fee-charging software into the software storage unit 1102 based on the rewriting limit information, the history information and the unique number ID of the fee-charging software, and also controls as to whether or not the number of installable times of the fee-charging software is updated. For example, if the rewriting limit information indicates the developing-use microprocessor, that is, indicates the freely re-writable state, the license managing unit according to the third embodiment stores the fee-charging software in the software storage unit 1102 without updating the number of installable times of the fee-charging software when the fee-charging software that has been installed in the past is re-installed. That is, it functions so that the re-installing is operable without updating the number of installable times of the fee-charging software.

The microprocessor according to the third embodiment is similar to the microprocessor 1100 (FIG. 2) explained in the first embodiment. That is, the differences from the microprocessor 1100 shown in FIG. 2 are the license storage unit 1103 and the license managing unit 1104. As described above, the license storage unit according to the third embodiment is obtained by adding the history information to the license storage unit 1103 shown in FIG. 2. An operation of the license managing unit according to the third embodiment will be described later. Moreover, in the third embodiment, when the fee-charging software is provided from the flash writer 1105, the unique number ID that specifies the fee-charging software is supplied.

Note that the license managing unit according to the third embodiment is described as a license managing unit 1104(3) below, and the license storage unit is described as a license storage unit 1103(3) below.

<Operation of License Managing Unit 1104(3)>

Figure 9:
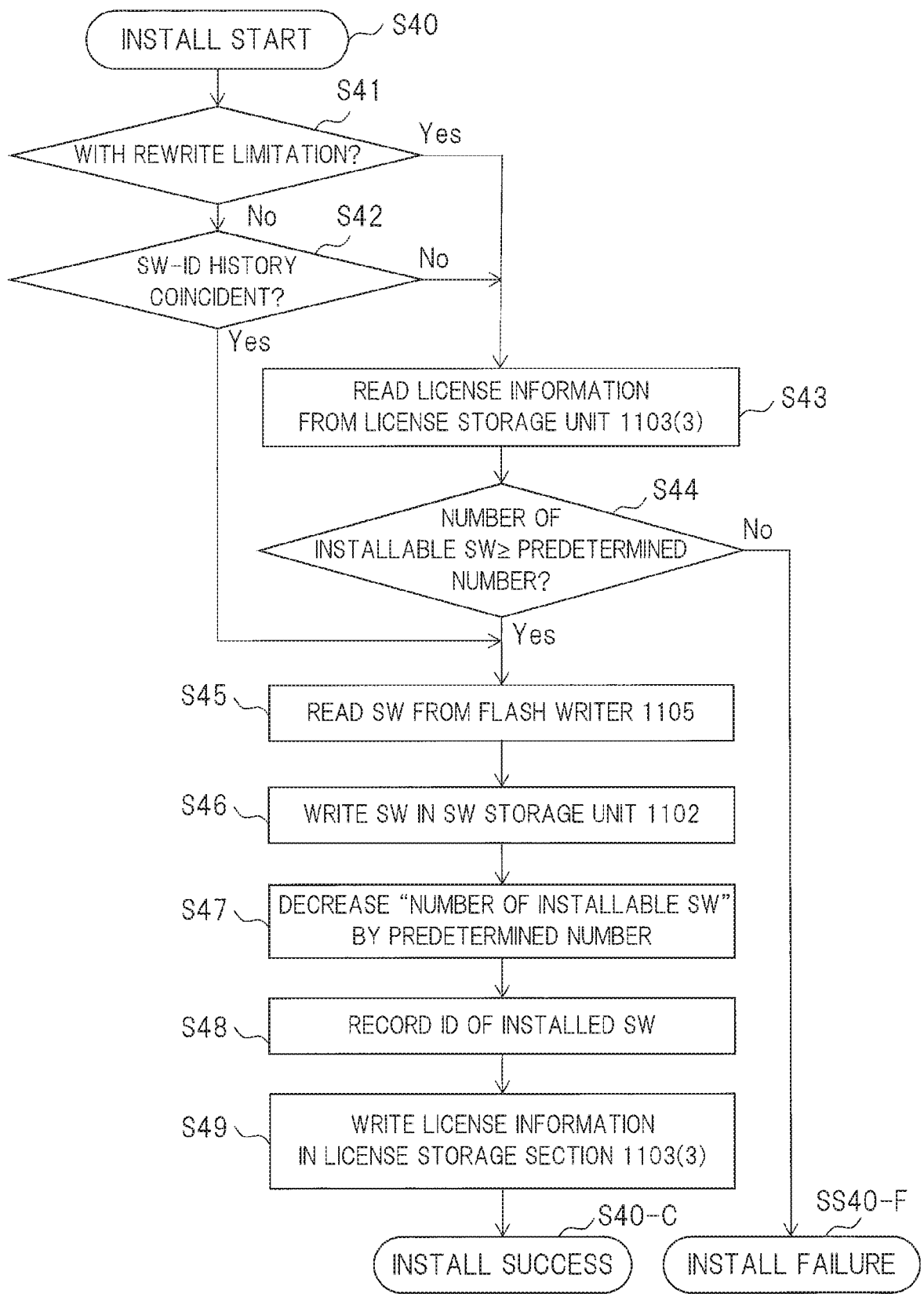
FIG. 9 is a flowchart showing an operation of a license managing unit according to a third embodiment.

Next, with reference to FIG. 9, the operation of the license managing unit 1104(3) according to the third embodiment will be explained. FIG. 9 is a flowchart showing the operation of the license managing unit 1104(3). In step S40, the user specifies the fee-charging software to be installed, and issues an instruction indicating that the fee-charging software is to be installed. In response to this instruction, the license managing unit 1104(3) starts the operation. Moreover, the flash writer 1105 provides the specified fee-charging software to the microprocessor 1100. That is, the installation is started.

In step S41, the license managing unit 1104(3) determines the rewriting limit information. When the rewriting limit information indicates the processor with the rewrite limitation (mass-production-use microprocessor), the license managing unit 1104(3) executes step S43 next. On the other hand, when the rewriting limit information indicates the processor with the freely rewritable state (developing-use microprocessor), the license managing unit 1104(3) executes step S42 next.

In step S42, the license managing unit 1104(3) reads the history information of the fee-charging software that has been installed in the past from the license storage unit 1103(3). The license managing unit 1104(3) compares the unique number ID included in the provided fee-charging software and the history information read from the license storage unit 1103(3) (in the drawing, described as "SW-ID history coincident?"). As a result of the comparison, if they match each other, the license managing unit 1104(3) executes step S45 next. If they do not match, it executes step S43 next.

For example, the fee-charging software has a configuration shown in FIG. 23 in which the unique number ID that specifies this fee-charging software is stored in the attribute information portion ATB. The license managing unit 1104(3) compares the unique number ID stored in the attribute information portion ATB and the history information, so that the license managing unit 1104(3) can determine whether or not the fee-charging software that has been installed in the past is installed again (is re-installed).

In step S43, the license managing unit 1104(3) reads the license information from the license storage unit 1103(3). In step S44, the license managing unit 1104(3) determines whether or not the number of installable times of the fee-charging software indicated by the read-out license information is the determined number (1) or larger. If it is determined in step S44 that the number of installable times of the fee-charging software is smaller than the determined number (1), the license managing unit 1104(3) executes step S40-F next. If it is determined that the number of installable times of the fee-charging software is the determined number (1) or larger, the license managing unit 1104(3) executes step S45 next.

In step S40-F, the license managing unit 1104(3) notifies the user of the failure of the installation. Thus, if the number of installable times of the fee-charging software is smaller than the determined number except for the case with the rewrite limitation (freely rewritable) or with the re-installation, the installation of fee-charging software is prohibited.

In step S45, the license managing unit 1104(3) reads the software portion SB of the fee-charging software provided by the flash writer 1105. In step S46, the license managing unit 1104(3) writes (stores) the read software portion SB in the software storage unit 1102.

Next, in step S47, the license managing unit 1104(3) decrements the number of installable times of the fee-charging software indicated by the license information read in step S43 by the determined number (1), and generates the license information indicating the number of installable times of the fee-charging software obtained by the decrement. Moreover, in step S48, into the license storage unit 1103(3), the license managing unit 1104(3) records, as the history information, the unique number ID that has been stored in the attribute information portion ATB corresponding to the software portion SB written in the software storage unit 1102 in step S46.

Moreover, in step S49, into license storage unit 1103(3), the license managing unit 1104(3) writes (stores) the license information generated in step S47.

When the license managing unit 1104(3) executes steps S45 to S49 after step S42, note that the license managing unit 1104(3) does not read the license information from the license storage unit 1103(3) since step S43 has not been executed. For this reason, in this case, the number of installable times of the fee-charging software in step S47 is not decremented. Moreover, the license information is not written to the license storage unit 1103(3) in step S49, either.

Lastly, in step S40-C, the license managing unit 1104(3) notifies the user of the success of the installation of the fee-charging software.

The above-described steps are performed every time the fee-charging software is installed.

In the present third embodiment, even if the rewrite limitation is set, that is, even if the processor is the mass-production-use microprocessor, the fee-charging software can be written in the software storage unit 1102 until the number of writing times reaches the number of installable times of the fee-charging software indicated by the license information as similar to the first embodiment. That is, even if the processor is the mass-production-use microprocessor, the fee-charging software can be installed by an amount corresponding to the previously-paid license fee.

Moreover, in the third embodiment, when a new fee-charging software is installed in the case without the rewrite limitation (freely rewritable), that is, in the case of the developing-use microprocessor, the fee-charging software can be written in the software storage unit 1102 until the number of writing times reaches the number of installable times of the fee-charging software indicated by the license information as similar to the first embodiment. Furthermore, in the case of the developing-use microprocessor, once the fee-charging software is installed, the history (unique number ID) of the installation is stored in the license storage unit 1103. Even if the software is uninstalled, the history of the installation remains in the license storage unit 1103(3). Therefore, when the same fee-charging software is reinstalled, the number of installable times of the fee-charging software is not decremented. That is, the information is not updated but maintained. In other words, the fee-charging software can be written in the software storage unit 1103 again without decrementing the number of installable times of the fee-charging software, and the writing can be executed by the execution unit 1101.

From another viewpoint, even if the number of installable times of the fee-charging software is smaller than the determined number (1), the fee-charging software can be re-installed. Therefore, when the developing-use microprocessor is used in the developing stage, the fee-charging software can be optionally uninstalled without taking into consideration the number of installable times of the fee-charging software, and then, the same software can be installed again (re-installed).

The microprocessor 1100 has been explained as an example. However, the present invention is not limited to this. In place of the microprocessor 1100, a personal computer or a portable terminal such as a smartphone may be used. Moreover, in place of the flash writer 1105, an optical disc reproduction device or a software storage device for providing the fee-charging software through a communication line may be used. Furthermore, as the software storage unit 1102, a hard disc or a memory card may be used. Even if the microprocessor, the flash writer and the software storage unit are changed as described above, the same effects can be obtained.

Modified Example

When, when the fee-charging software has a problem such as a bug, the software distribution source provides a fee-charging software to which countermeasure against the bug are provided (fee-charging software with countermeasure) in some cases. In this case, the already-installed fee-charging software and the fee-charging software with the countermeasure have the same unique number ID as each other.

Since the unique number ID is the same, in the (freely rewritable) developing-use microprocessor without the setting of the rewrite limitation, the user can re-install the fee-charging software with countermeasure without being influenced by the number of installable times of the fee-charging software.

On the other hand, in the mass-production-use microprocessor with the rewrite limitation, it is difficult to install the fee-charging software with countermeasure unless the number of installable times of the fee-charging software is the determined number or larger.

In this modified example, for example, the attribute information portion ATB shown in FIG. 23 stores information (code) indicating that the fee-charging software stored in the software portion SB is the fee-charging software with countermeasure against the software bug. Moreover, in step S41 shown in FIG. 9, after the license managing unit 1104(3) determines that the software has the rewrite limitation, the license managing unit 1104(3) determines whether or not the attribute information portion ATB stores the information indicating the fee-charging software with countermeasure. If it is determined that the attribute information portion ATB stores the information indicating the fee-charging software with countermeasure, the license managing unit 1104(3) executes step S42 next. In this manner, even in the mass-production-use microprocessor, the fee-charging software with countermeasure can be re-installed without decrementing the number of installable times of the fee-charging software as similar to the developing-use microprocessor. From another viewpoint, even if the number of installable times of the fee-charging software is smaller than the determined number, the fee-charging software with countermeasure can be re-installed in both of the mass-production-use microprocessor and the developing-use microprocessor.

When it is determined that the attribute information portion ATB stores the information indicating the fee-charging software with countermeasure, the license managing unit 1104 may forcibly change the above-described rewriting limit information so as to indicate the freely rewritable state.

According to this modified example, the fee-charging software with countermeasure can be installed without depending on the number of installable times of the fee-charging software. That is, the fee-charging software can be updated without increasing the load on the user.

Fourth Embodiment

In the third embodiment, the mass-production-use microprocessor and the developing-use microprocessor have been explained. As explained in the third embodiment, in comparison with the mass-production-use microprocessor, the developing-use microprocessor has functions for the development in many cases. Therefore, the developing-use microprocessor has a more expensive hardware price except for the license fee than that of the mass-production-use microprocessor. From another viewpoint, the hardware price of the mass-production-use microprocessor can be lowered by reducing the functions for the development.

Since the developing-use microprocessor is more expensive than the mass-production-use microprocessor, the developing-use microprocessor is probably difficult to be used in the mass-production stage but still can be used. When the developing-use microprocessor is used in the mass-production stage, the fee-charging software can be copied without permission. In order to reduce damages caused by the copying, the limit on the number of activation times of the fee-charging software is set in the fourth embodiment.

As a method of determining that the number of activation times of the fee-charging software is either limited or limit-free, any of the methods (1) to (6) explained in the third embodiment is used. That is, the rewrite limitation information explained in the third embodiment is used as information of limitation of number of activation times. This manner provides the microprocessor as a microprocessor with limitation of number of activation times or a microprocessor with limitation free of number of activation times because it becomes difficult to change the information of limitation of number of activation times after the seller (manufacturer) provides a microprocessor.

FIG. 10 is a flowchart showing an operation of a microprocessor 1100 according to the fourth embodiment. The configuration of the microprocessor 1100 according to the fourth embodiment is formed by adding an activation number storage unit (not shown) for storing the number of activation times of the fee-charging software, an executed flag "flag (bits)" indicating the completion of execution of the fee-charging software and an execution number unit for setting the number of the execution times of the fee-charging software to the configuration of the microprocessor shown in FIG. 2. Here, the activation number storage unit is configured so as to maintain the value even in reset. The executed flag "flag" is set to an unexecution (false) state by the reset when the reset state is released. Moreover, for the execution number unit, the number of the activation permission times is previously set. For example, the seller (manufacturer) sets a predetermined number of execution times "n" for the execution number unit, and provides the microprocessor to a user.

FIG. 10 shows the microprocessor 1100 as MCU. In step S50, the microprocessor MCU is activated by, for example, releasing the reset ("reset") state. At this time, the executed flag "Flag" is set to the unexecution (false) state.

In step S51, the execution unit 1101 in the microprocessor MCU executes a predetermined software so as to allow the electronic apparatus including the microprocessor MCU to achieve a predetermined function. This predetermined software is supposed to be the fee-charging software (SW) or the software for use in calling the fee-charging software (SW). FIG. 10 shows a case in which the above-described predetermined software calls the fee-charging software (SW). In step S51 of FIG. 10, a command (jump, call, etc.) is exemplified as a command for calling the fee-charging software.

In step S52, the license managing unit 1104 determines whether or not the software to be executed by the microprocessor MCU is the fee-charging software (software having the limitation of number of activation times). For example, if a software in a specific region in the software storage unit 1102 is read, the license managing unit 1102 determines that the fee-charging software is to be executed. If the software to be executed is not the fee-charging software (No) in step S52, the license managing unit 1104 executes step S56. If it determines that the software is the fee-charging software (Yes), it executes step S53. In FIG. 10, step S52 is described as "Is That The SW with Limit of Number of Activation Times?".

In step S53, the license managing unit 1104 determines whether or not the executed flag "flag" is in the executed (true) state. That is, in step S53, it determines whether or not the fee-charging software has been executed. If it has been already executed (Yes), the license managing unit 1104 executes step S56 next. If it has not been executed (No), the unit executes step S54.

In step 54, the license managing unit 1104 determines whether or not the number of activation times stored in the activation number storage unit exceeds the number of execution times "n" stored in the execution number storage unit. Here, "n" is supposed to be previously set in the execution number unit as the number of execution times of the limit. If the number of activation times stored in the activation number storage unit exceeds the number of execution times "n" (No), the license managing unit 1104 executes step S57 next. If the number of activation times does not exceed the number of execution times "n" (Yes), it executes step S55 next.

In step S55, the license managing unit 1104 increases the number of activation times. For example, the number of activation times is incremented by 1, and is stored in the activation number storage unit. For example, the number of activation times stored in the activation number storage unit is updated from 1 to 2. Moreover, in step S55, the executed flag "flag" is set to the executed (true) state. Thereafter, in step S56, the license managing unit 1104 permits the execution unit 1101 inside the microprocessor MCU to execute the fee-charging software called in step S51. Thereafter, the sequence returns to step S51 again. When the fee-charging software is called, steps S52 and S53 are executed. In this case, since the executed flag "flag" has been changed from the unexecution (false) state to the executed (true) state when the fee-charging software is executed first (at the first time), the license managing unit 1104 executes step S56 after step S53. As a result, after the microprocessor MCU is activated in step S50, the number of activation times stored in the activation number storage unit is not increased even if the same fee-charging software is repeatedly activated, and step S57 is not executed.

Thereafter, the sequence is reset, and the microprocessor MCU executes step S50 again in response to the release of the reset state, so that the executed flag "flag" is set to the unexecution (false) state in step S50. For this reason, in step S55, the license managing unit 1104 increments the number of activation times stored in the activation number storage unit. That is, the number of activation times stored in the activation number storage unit is updated from 2 to 3. Thereafter, steps S51, S52, S53 and S56 are executed. As a result, also in this case, the fee-charging software is executed in the microprocessor MCU.

Moreover, the sequence is reset, and the microprocessor MCU executes step S50 again in response to the release of the reset state. The executed flag "flag" is set to the unexecution (false) state in step S50. In step S54, the number of activation times stored in the activation number storage unit and the number of execution times "n" are compared with each other. Here, if, for example, the number of execution times "n" is 2, 3 is stored in the activation number storage unit as the number of activation times at the time of the previous activation of the microprocessor MCU in step S50. Thus, the number of activation times (3) exceeds the number of execution times "n" (2) in step S54, and therefore, the license managing unit 1104 executes step S57.

In step S57, the license managing unit 1104 prohibits the execution of the software provided from the software storage unit 1102 by the execution unit 1101. This manner prohibits the microprocessor MCU from such execution of the same fee-charging software as exceeding the number of execution times "n", so that this fee-charging software is not activated. In step S57, note that the license managing unit 1104 notifies the execution unit 1101 of, for example, occurrence of an error.

As described above, every time the software having the limitation of number of activation times such as the fee-charging software is activated in step S50, the number of activation times stored in the activation number storage unit is incremented, and the execution of the software is prohibited when the number of activation times exceeds the previously-set number of execution times. In other words, when the electronic apparatus or the microprocessor MCU is continuously operated without being reset, the software having the limitation of the number of activation times is continuously executed. On the other hand, when an operation for the reset or others is executed on the electronic apparatus or the microprocessor MCU, the number of activation times is counted, and, when the number reaches a predetermined number of times (number of execution times), the activation of the software by the electronic apparatus or the microprocessor is stopped.

The microprocessor according to the fourth embodiment is used as the developing-use microprocessor. Thus, when the developing-use microprocessor is used as the mass-production-use microprocessor, the software without the permission (the fee-charging software duplicated by the copying or others) can be prevented from being activated so as to exceed the number of execution times, so that the damages can be reduced.

The explanation has been made while exemplifying the microprocessor MCU (1100). However, the present invention is not limited to this. In place of the microprocessor MCU, a personal computer or a portable terminal such as a smartphone may be used. Moreover, in place of the flash writer 1105, an optical disc reproduction device or a software storage device for providing the fee-charging software through a communication line may be used. Furthermore, as the software storage unit 1102, a hard disc or a memory card may be used. Even if the microprocessor, the flash writer and the software storage unit are changed as described above, the same effects can be obtained.

Modified Example

The third embodiment and the fourth embodiment are combined with each other. FIG. 11 is an explanatory diagram showing a state in the combination of the third embodiment and the fourth embodiment.

By the above-described rewriting control information, the developing-use microprocessor is set to the freely rewritable state described in the third embodiment and the state having the limitation of number of activation times described in the fourth embodiment. On the other hand, by the rewriting control information, the mass-production-use microprocessor is set to the rewrite limitation state described in the third embodiment and the state with the limitation free of number of activation times described in the fourth embodiment. Since the freely rewritable state is set even if the limitation of number of activation times is set in the developing-use microprocessor, the fee-charging software can be re-installed by the rewriting in the developing stage. Thus, when the user uses the developing-use processor in the developing stage for products, the developing-use microprocessor can be prevented without inconvenience from being used in the mass-production stage.

Fifth Embodiment

Figure 12:
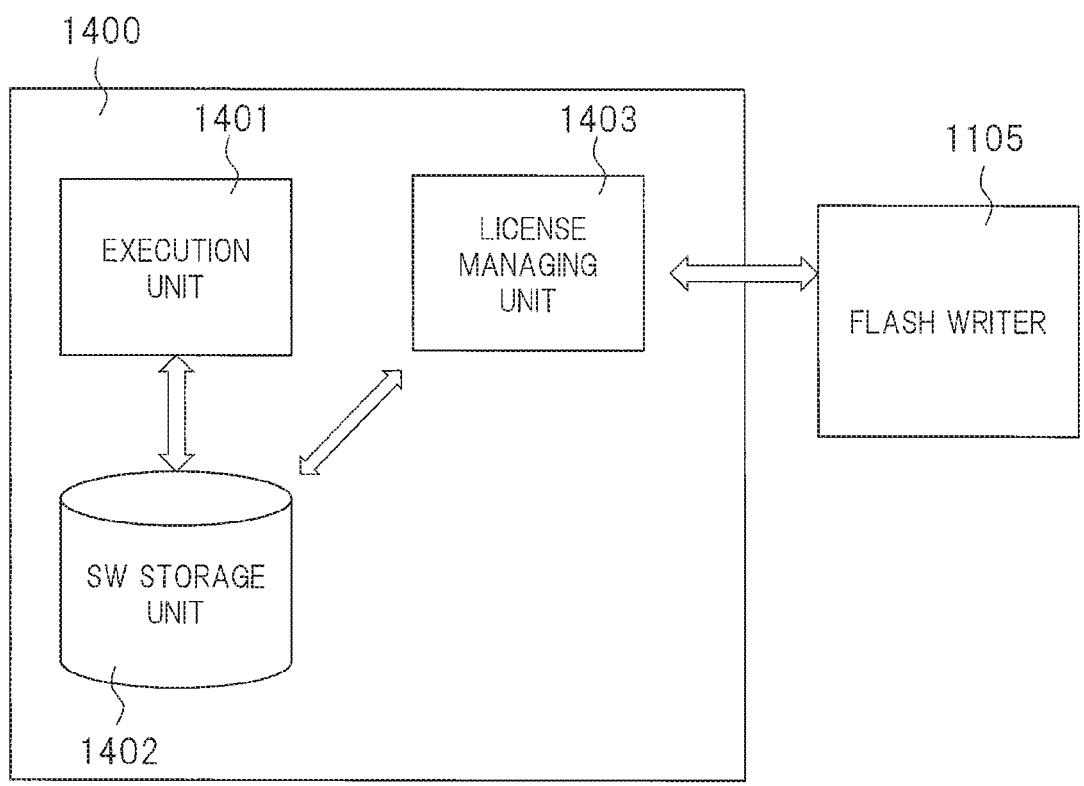
FIG. 12 is a block diagram showing a configuration of a semiconductor device according to a fifth embodiment.

FIG. 12 is a block diagram showing a configuration of a semiconductor device according to a fifth embodiment. Here, a microprocessor will be exemplified as the semiconductor apparatus for explanation. In FIG. 12, reference numeral 1400 represents the microprocessor. The microprocessor 1400 includes an execution unit 1401 that executes the software, a software storage unit 1402 that is coupled to the execution unit 1401 and that stores the software and a license managing unit 1403. As similar to the description in the first embodiment, the microprocessor 1100 includes not only the above-described execution unit 1401, software storage unit 1402, and license managing unit 1403 but also peripheral circuit units although omitted in FIG. 12. Moreover, as similar to the first embodiment, the respective units are formed on one semiconductor chip by using a publicly-known semiconductor manufacturing technique, and are sealed in one package although not particularly limited. The seller (manufacturer) provides a microprocessor to a user in a state of a semiconductor chip or a packaged state in which the semiconductor chip is sealed.

In the fifth embodiment, the software storage unit 1402 is configured by a nonvolatile memory (flash memory) that is electrically rewritable. In FIG. 12, reference numeral 1105 represents the flash writer explained in FIG. 2, which provides the software to the microprocessor 1400.

The execution unit 1401 reads the software from the software storage unit 1402, and executes the software. To the software storage unit 1402, the software is provided from the flash writer 1105 through the license managing unit 1403, and is written (stored) therein.

Figure 13:
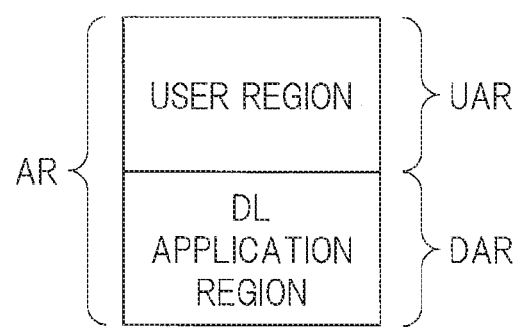
FIG. 13 is an explanatory diagram showing an address space of a software storage unit according to the fifth embodiment.

The license managing unit 1403 manages regions (address spaces) included in the software storage unit 1402 as a plurality of regions. Here, an example of management for two regions will be explained. That is, a region of the software storage unit 1402 is separated into a download region (hereinafter, referred to also as "DL application region") where the fee-charging software is stored and a region (hereinafter, referred to also as "user region") other than this region, and the respective regions are managed. FIG. 13 is an explanatory diagram showing the address spaces of the software storage unit 1402. In FIG. 13, reference character AR represents the region (address space) of the software storage unit 1402, reference character UAR represents the user region, and reference character DRA represents the DL application region.

A specific fee-charging software can be installed only into the DL application region DRA, and is not permitted to be installed into the user region UAR. Moreover, the software separately purchased by the user, the charge-free software and/or the software created by the user can be installed into both of the DL application region and the user region. In other words, the specific fee-charging software is permitted to be stored only in the DL application region DRA, and is not permitted to be stored in the user region UAR.

The license managing unit 1403 stores information indicating which region of the software storage unit 1402 is to be the DL application region DAR and which region thereof is to be the user region UAR. That is, the DL application region DAR and the user region UAR are defined in accordance with set information stored in the license managing unit 1403. The DL application region and the user region are set in the license managing unit 1403 when the seller (manufacturer) provides the microprocessor 1400 to the user. After the provision by the seller (manufacturer), it is made difficult to change the setting of the DL application region and the user region. They can be set by using any of the methods (1) to (6) described in the first embodiment.

The setting information that defining the DL application region DAR and the user region UAR can be considered to be the license information. Therefore, the license managing unit 1403 shown in FIG. 12 can be considered to include the license storage unit that stores license information.

When the method (2) is adopted, note that the above-described specific code is not provided to the user, but possessed by the seller (manufacturer). Therefore, for example, when the user desires to change a storage capacity ratio between the DL application region DAR and the user region UAR, or when the processor that has been returned after provided to the user is provided to another user, the seller (manufacturer) can change the storage capacity ratio by using the specific code, and can provide the micropro- cessor.

Figure 14:
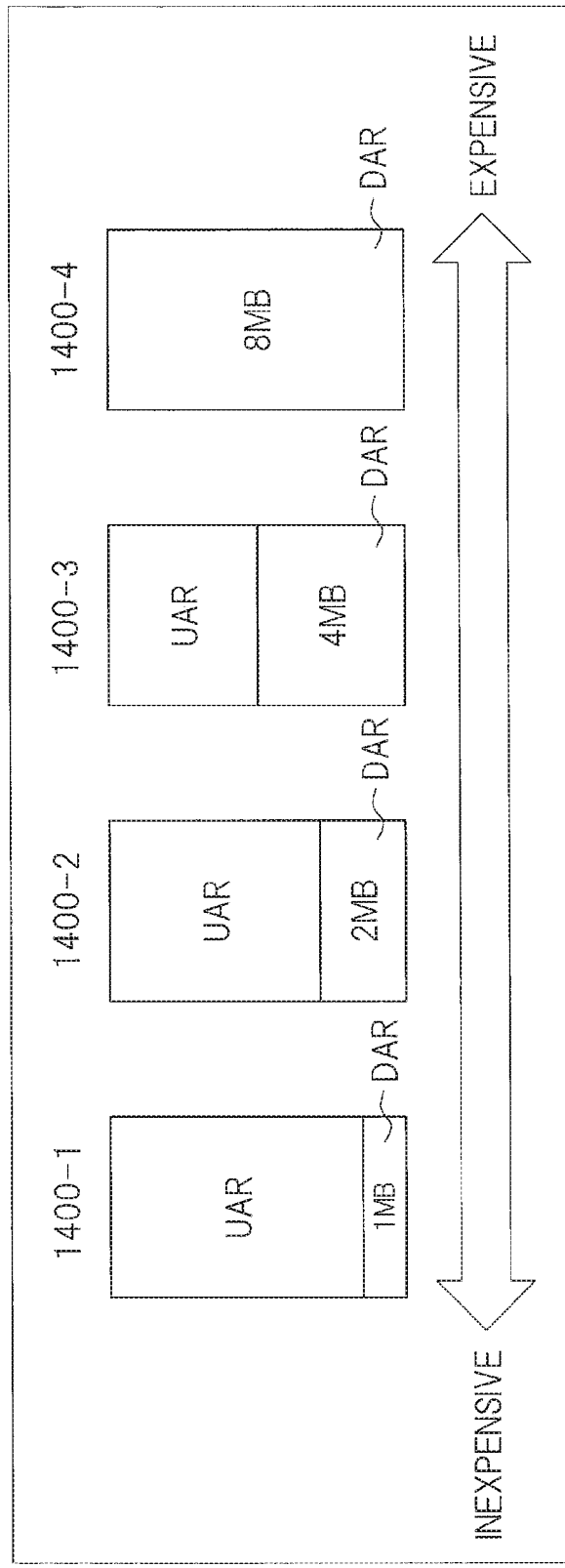
FIG. 14 is an explanatory diagram showing a capacity ratio of a microprocessor according to the fifth embodiment.

FIG. 14 is an explanatory diagram showing the storage capacity ratio of the microprocessor 1400 that is provided to the user by the seller (manufacturer). In FIG. 14, each of reference numerals 1400-1 to 1400-4 represents the micro- processor. The configuration of each of the microprocessors 1400-1 to 1400-4 is the same as the configuration of the microprocessor 1400 shown in FIG. 12, and is different therefrom in only the storage capacity ratio in the software storage unit 1402.

That is, in the microprocessor 1400-1, the region AR in the software storage unit 1402 is allocated to 1 Mbyte (1 MB) as the DL application region DAR and is also allocated to 7 Mbytes as the user region UAR. In the micro-processor 1400-2, the region AR in the software storage unit 1402 is allocated to 2 Mbytes (2 MB) as the DL application region DAR and is also allocated to 6 Mbytes as the user region UAR. Moreover, in the microprocessor 1400-3, the region AR in the software storage unit 1402 is allocated to 4 Mbytes (4 MB) as the DL application region DAR and is also allocated to 4 Mbytes as the user region UAR. Similarly, in the microprocessor 1400-4, all the region of the region AR in the software storage unit 1402 are allocated as the DL application region DAR (8 Mbytes).

In this manner, by changing the capacity ratio of the regions to be allocated, various types of microprocessors having the same configuration as one another can be easily provided. In this case, as the capacity (storage capacity) of the DL application region DAR becomes larger, more pieces of the fee-charging software can be stored (housed) or the fee-charging software with a larger size can be stored. That is, as the DL application region DAR becomes larger, a higher license fee is added to the price (hardware price) of the microprocessor 1400 to form the price of the micropro- cessor. As a result, as shown in FIG. 14, from the micro- processor 1400-1 toward the microprocessor 1400-4, the selling price of the microprocessor becomes more expen- sive. In this case, by taking into consideration the type, the size of the fee-charging software to be installed or others, the user can select any microprocessor from the microproces- sors 1400-1 to 1400-4, and can purchase the microprocessor.

<License Managing Unit 1402>

Next, the operation of the license managing unit 1402 will be explained. Here, the explanations will be made about a case in which functions of the license managing unit 1402 are achieved by an execution unit that is not shown and different from the execution unit 1401 and by software executed by the execution unit not shown.

Figure 15:
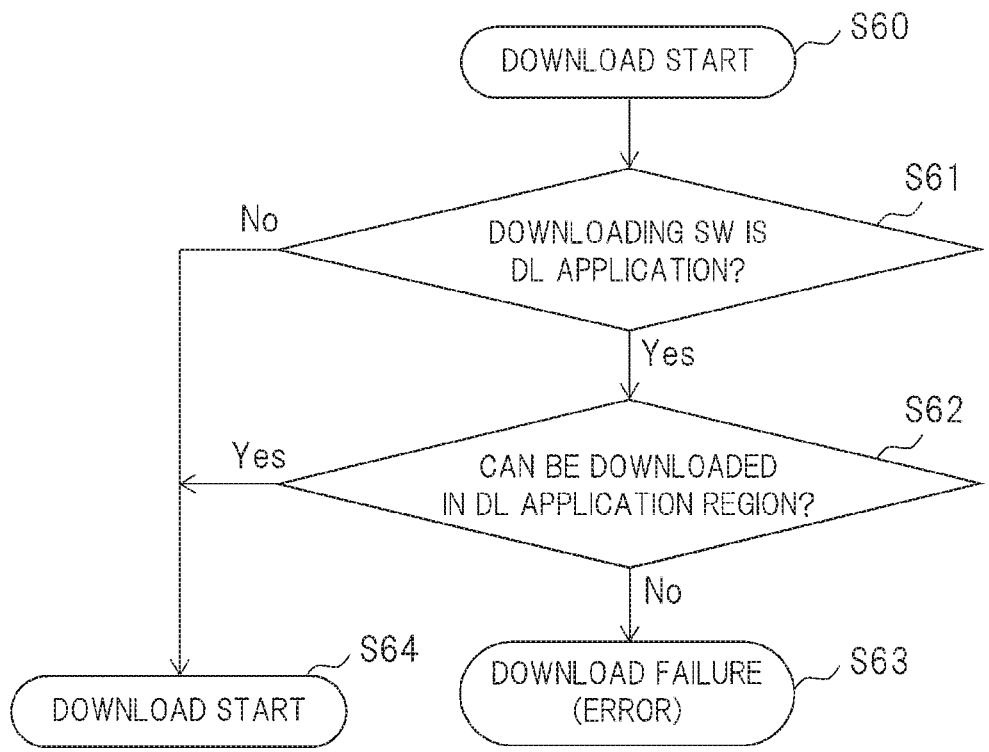
FIG. 15 is a flowchart showing an operation of a license managing unit according to the fifth embodiment.

FIG. 15 is a flowchart showing the operation of the license managing unit 1402. In FIG. 15, in step S60, the software to be downloaded is assigned, and the download of the soft- ware is instructed. Thus, the specified software is provided from the flash writer 1105 to the microprocessor 1400. In FIG. 15, step S60 is shown as "download start".

In step S61, the license managing unit 1403 determines whether or not the provided software is the specific fee- charging software. That is, the license managing unit 1403 determines whether or not the software to be downloaded is the specific fee-charging software (hereinafter, referred to also as "specific DL application") stored in the DL applica- tion region DAR. If it has been determined that the software is not the specific DL application (No) as a result of the determination, the license managing unit 1403 executes step S64. In this case, in step S64, the license managing unit 1403 writes (stores) the provided software into the user region UAR inside the software storage unit 1402. By storing it in the user region UAR, the execution by the execution unit 1401 can be achieved, and therefore, the downloading is started in step S64.

On the other hand, if the license managing unit 1401 has determined that the software is the specific DL application in step S61, step S62 is executed by the license managing unit 1401 next. In step S62, the license managing unit 1403 determines whether or not the specific DL application provided from the flash writer 1105 can be downloaded to the DL application region DAR. For example, when another DL application has been already stored in the DL application region DRA so that the storage capacity in the region where the provided specific DL application is to be stored is insufficient, the license managing unit 1403 determines that the downloading is impossible (No). In this case, the license managing unit 1403 executes step S63 next. On the other hand, if the license managing unit 1403 determines that the downloading is possible (Yes), the license managing unit 1403 executes step S64.

When step S64 is executed to be continued from step S62, the license managing unit 1403 writes (stores) the provided software (specific DL application) into not the user region UAR but the DL application region DAR. That is, in step S64, the downloading of the specific DL application into the DL application region DAR is started.

On the other hand, if it determines in step S62 that the downloading is impossible (No), the license managing unit 1403 determines failure in the downloading in step S63, and does not execute the writing of the software into the software storage unit 1402. Moreover, it notifies the execution unit 1401 of occurrence of an error.

In this manner, the determination of the software to be downloaded and the writing of the software into the software storage unit 1402 are executed by the license managing unit 1403 for each piece of software to be downloaded, so that the specific fee-charging software (DL application) can be stored in the DL application region DAR and can be executable by the execution unit 1401.

<Control by Hardware>

Figure 16:
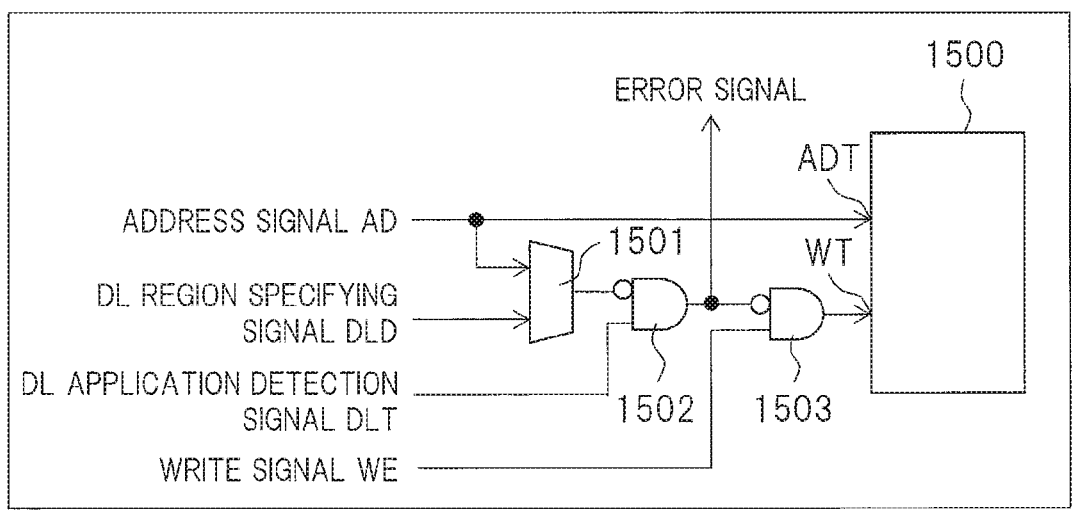
FIG. 16 is a block diagram showing a configuration in a case of control of a software storage unit according to the fifth embodiment by hardware.

In FIG. 15, the example of the control for the software storage unit 1402 by the software has been explained. However, the control for the software storage unit 1402 may be achieved by hardware. That is, the software storage unit 1402 may be controlled by using hardware such as a logic circuit. FIG. 16 is a block diagram showing a configuration in a case of control for the software storage unit 1402 by hardware.

FIG. 16 shows only a configuration of a portion related to the software storage unit 1402. In FIG. 16, reference numeral 1500 represents a flash memory. In FIG. 16, the flash memory 1500 corresponds to a portion in which the software is stored in the software storage unit 1402. The flash memory 1500 includes an address terminal, a write terminal, a read terminal and a data terminal. In FIG. 16, only the address terminal ADT and the write terminal WT among these terminals are shown, and the read terminal and the data terminal are omitted. In the flash memory 1500, an address signal is supplied to the address terminal ADT, and a write signal with a high level is supplied to the write terminal WT, so that data from the data terminal is electrically written and stored in a region specified by the address signal supplied to the address terminal ADT.

The license managing unit 1403 forms a DL region specifying signal DLD that specifies an area of the address allocated as the DL application region DAR and a DL application detection signal DLT that indicates whether or not the software to be downloaded is the specific DL application. The DL region specifying signal DLD is formed based on information set by the previously-explained methods (1) to (6). Moreover, as shown in FIG. 14, the region to be specified by this DL region specifying signal DLD is different among the microprocessors 1400-1 to 1400-4. For example, when the information stored in the attribute information portion ATB shown in FIG. 23 indicates that the software is the specific DL application, the DL application detection signal DLT is formed by the license managing unit 1403. The DL region specifying signal DLD formed by the license managing unit 1402 is changed by the price of the microprocessor, and therefore, can be considered to be the license information.

In the example of FIG. 16, the address signal AD and the write signal WE are formed by the execution unit 1401. That is, the address signal AD that indicates the region where the software is to be written in the flash memory 1500 is output from the execution unit 1401, and the write signal WE that instructs the writing is also output from the execution unit 1401. Obviously, both of the address signal AD and the write signal WE may be output from the license managing unit 1403.

In FIG. 16, reference numeral 1501 represents a comparison circuit. The comparison circuit 1501 compares the address signal AD and the DL region specifying signal DLD with each other. If the address signal AD indicates a portion inside the address area indicated by the DL region specifying signal DLD, the comparison circuit 1501 outputs a high level. On the other hand, if the address signal AD indicates a portion outside the address area indicated by the DL region specifying signal DLD, the comparison circuit 1501 outputs a low level. The license managing unit 1403 sets the DL application detection signal DLT to the high level when the specific DL application is provided from the flash writer 1105, and sets the DL application detection signal DLT to the low level when the software is not the specific DL application. Moreover, in the writing, the write signal WE is set to the high level.

The output of the comparison circuit 1501 is supplied while being inversed in its phase to one of terminals of an AND circuit 1502, and the DL application detection signal DLT is supplied to the other terminal of the AND circuit 1502. The output of the AND circuit 1502 is inverted in its phase and supplied to one input of the AND circuit 1503, and the write signal WE is supplied to the other input of the AND circuit 1503. Here, the output of the AND circuit 1502 is supplied to the execution unit 1401 as an error signal. Moreover, the address signal AD is supplied to the address terminal ADT of the flash memory 1500, and an output of an AND circuit 1503 is supplied to the write terminal WT.

When the specific DL application is supplied from the flash writer 1105, the address where the DL application is to be written is supplied as an address signal AD. At this time, since the software is the specific DL application, the license managing unit 1403 outputs a DL application detection signal DLT with a high level. If the address signal AD at this time indicates the part inside the address area indicated by the DL region specifying signal DLD, the output signal of the comparison circuit 1501 becomes the high level. Since the output signal of the comparison circuit 1501 is inverted in its phase to supply the low level to the AND circuit 1502, the output signal of the AND circuit 1502 becomes the low level. Therefore, the error signal also becomes the low level. In the example of FIG. 16, when the error signal is the high level, the error is determined. For this reason, the execution unit 1401 does not recognize this state as the error.

When the output signal of the AND circuit 1502 is the low level, the high level that is the phase-inverted output signal of the AND circuit 1502 and the write signal WE with the high level for instructing the writing are supplied to the AND circuit 1503. Thus, the AND circuit 1503 supplies the signal with the high level to the write terminal WT of the flash memory 1500. As a result, in the flash memory 1500, the writing is executed in the region defined by the address signal AD supplied to the address terminal ADT.

On the other hand, when the license managing unit 1403 outputs the DL application detection signal DLT with the high level indicating that the software is the specific DL application, if the address signal AD defines the part outside the address area indicated by the DL region specifying signal DLD, the output signal of the AND circuit 1502 becomes the high level. That is, the error signal becomes the high level, so that the execution unit 1401 recognizes the occurrence of the error. Moreover, when the output signal of the AND circuit 1502 becoming the high level, the output signal of the AND circuit 1503 becomes the low level. As a result, the low level is supplied to the write terminal WT of the flash memory 1500, so that the writing is prohibited.

In this manner, in the downloading of the specific DL application, if it is determined that the address of the specific DL application is inside the address area indicated by the DL region specifying signal DLD to indicate the specific DL application, the specific DL application is written into the DL application region DAR inside the flash memory 1500. On the other hand, if the address of the specific DL application indicates the portion outside the address area indicated by the DL region specifying signal DLD, the specific DL application is not written into the flash memory 1500, and the error signal indicating the error is generated.

Figure 17:
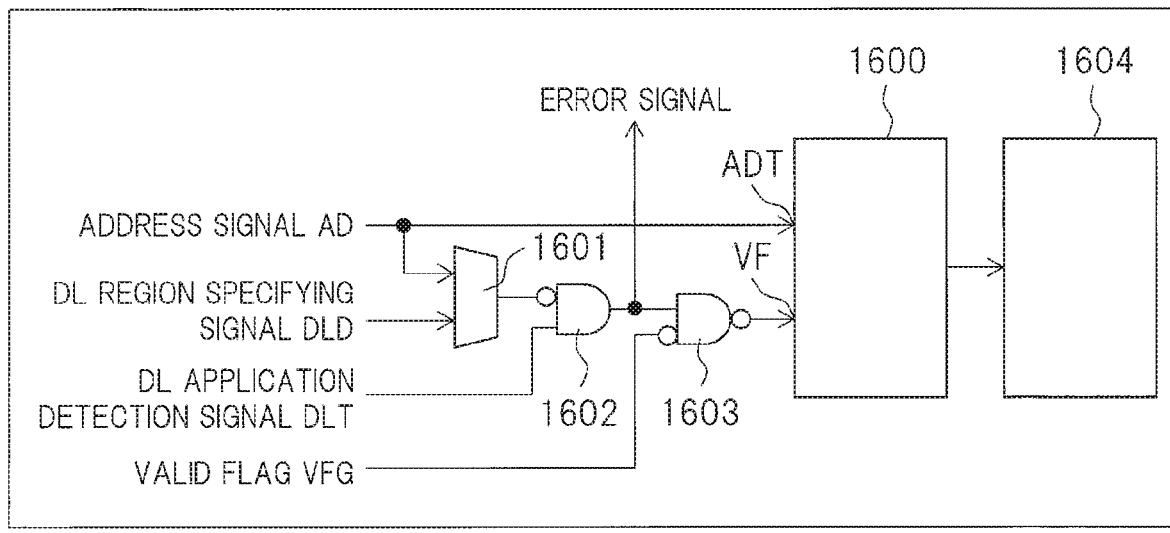
FIG. 17 is a block diagram showing another configuration in the case of control of the software storage unit according to the fifth embodiment by hardware.

FIG. 17 is a block diagram showing another configuration in the case of the control for the software storage unit 1402 by hardware. As similar to FIG. 16, FIG. 17 shows only a portion related to the above-described software storage unit 1402. In FIG. 17, reference numeral 1604 represents a flash memory, and reference numeral 1600 represents a write buffer. Also in the example shown in FIG. 17, a portion of the software storage unit 1402 where the software is to be stored corresponds to the flash memory 1604. In the flash memory 1604, a writing speed is comparatively slow. Therefore, in FIG. 17, the write buffer 1600 is provided.

The write buffer 1600 is configured by, for example, a static-type memory, and is operated at a higher speed than that in the flash memory 1600. The write buffer 1600 includes an address terminal, a valid flag terminal and a data terminal. FIG. 17 shows the address terminal and the valid flag terminal as ADT and V-F, and the data terminal is omitted. The provided software is written first into not the flash memory 1604 but the write buffer 1600. The write buffer 1600 includes a valid bit corresponding to a region, and the valid bit is set depending on whether or not data written into the corresponding region is effective data. For example, the valid bit is set to the high level if the data written into the corresponding region is the effective data, and the valid bit is set to the low level if it is ineffective data.

If the valid bit indicates that the data is the effective data (high level), the write buffer 1600 transfers the data written in the region corresponding to the valid bit to the flash memory 1604 at an appropriate timing, and writes and stores the data in the flash memory 1604. Since the write buffer 1600 is operated at a comparatively high speed, the speed of the writing can increase. If the valid bit indicates that the data is the ineffective data (low level), the data written in the region corresponding to this valid bit is not transferred to the flash memory 1604, so that the data is not written into the flash memory 1604.

As similar to the example shown in FIG. 16, also in the example shown in FIG. 17, the DL region specifying signal DLD and the DL application detection signal DLT are output from the license managing unit 1403. Moreover, the address signal AD is output from the execution unit 1401. In FIG. 17, reference numeral 1601 represents a comparison circuit, and the comparison circuit 1601 compares the address signal AD and the DL region specifying signal DLD with each other. The comparison circuit 1601 sets the output signal to the high level if the address signal AD specifies a portion inside the region specified by the DL region specifying signal DLD, and it sets the output signal to the low level if the signal specifies a portion outside the region specified by the DL region specifying signal DLD.

The output signal of the comparison circuit 1601 is inverted in its phase, and is supplied to one input of the AND circuit 1602, and the DL application detection signal DLT is supplied to the other input of the AND circuit 1602. The output signal of the AND circuit 1602 is supplied to one input of a NAND circuit 1603, and is also supplied to the execution unit 1401 as an error signal. To the other input of the NAND circuit 1603, a valid flag VFG indicating a state of the valid bit is inverted in its phase and supplied from the write buffer 1600. The output signal of this NAND circuit 1603 is supplied to a valid flag terminal V-F of the write buffer 1600.

When the specific DL application is supplied from the flash writer 1105, the license managing unit 1403 sets the DL application detection signal DLT to the high level. At this time, the address signal AD is an address signal that specifies a region of the flash memory 1604 where the DL application is to be stored. If the region specified by the address signal AD is inside an area specified by the DL region specifying signal DLD, the output signal of the comparison circuit 1601 becomes the high level. Since the output signal with the high level from the comparison circuit 1601 is inverted in its phase and is supplied to the AND circuit 1602, the output signal of the AND circuit 1602 becomes the low level. As a result, the error signal becomes the low level that indicates no occurrence of the error, and the signal notifies the execution unit 1401 of no occurrence of the error.

At this time, if the effective data is not stored in the region of the write buffer 1600 specified by the address signal ADT, the write buffer 1600 outputs the valid flag VFG with the low level. Thus, the output signal with the low level from the AND circuit 1602 and the valid flag VFG with the high level formed by the phase inversion are supplied to the NAND circuit 1603, so that the NAND circuit 1603 supplies the signal with the high level to the valid flag terminal V-F. As a result, the software that is the DL application is stored in the region inside the write buffer 1600 specified by the address signal ADT at this time, and the high level indicating that the data is the effective data is stored in the valid bit corresponding to the region specified by the address signal ADT. By setting the valid bit to the high level, the stored DL application is transferred to and stored in the flash memory 1604 at an appropriate timing.

On the other hand, for example, if the region specified by the address signal AD is outside the region specified by the DL region specifying signal DLD, the output signal of the comparison circuit 1601 becomes the low level. At this time, when the DL application detection signal DLT becomes the high level, the output signal of the AND circuit 1602 becomes the high level. Thus, the error signal with the high level can be supplied to the execution unit 1401, so that the execution unit 1401 can recognize the occurrence of the error. Since the output signal with the high level from the AND circuit 1602 and the valid flag VFG with the high level formed by the phase inversion are supplied to the NAND circuit 1603, the output signal of the NAND circuit 1603 becomes the low level. As a result, at this time, the valid flag corresponding to the region specified by the address signal AD is set to the low level. Since the valid flag is set to the low level, the data stored in the region specified by the address signal AD at this time is not transferred to the flash memory 1604, so that the data is not written into the flash memory 1604.

In this manner, in the downloading of the specific DL application, if it is determined that the address of the specific DL application is the portion inside the address area indicated by the DL region specifying signal DLD to indicate the specific DL application, the valid bit is set as the effective data. The DL application written in the region set as the effective data is written into the DL application region DAR inside the flash memory 1604. On the other hand, if the address of the specific DL application indicates the portion outside the address area indicated by the DL region specifying signal DLD, the specific DL application is not written into the flash memory 1500, and the error signal indicating the error is generated.

Explanations have been given by exemplifying the microprocessor 1401 as a semiconductor device; however, the semiconductor device is not intended to be limited by this.

Moreover, in place of the microprocessor 1401, a personal computer or a portable terminal such as a smartphone may be used. Furthermore, in place of the flash writer 1105, an optical disc reproduction device or a software storage device that provides the fee-charging software through a communication line may be used. As the software storage unit 1402, a hard disc or a memory card may be used. Even when the microprocessor, the flash memory and the software storage unit are changed as described above, the same effects can be obtained.

Modified Example

The fifth embodiment may be combined with, for example, the first embodiment or the second embodiment. That is, the license storage unit 1103 (license storage section 1305 shown in FIG. 6) shown in FIG. 2 is added to the configuration explained in the fifth embodiment. In this case, by the license managing unit 1403, the license information stored in the license storage unit 1103 is updated, and the number of installable times of the fee-charging software indicated by the license information is also confirmed.

As a result, by both of the number of installable times and the storage capacity of the DL application region DAR, the storage of the software in the DL application region DAR inside the software storage unit 1402 can be controlled. In this case, even if, for example, the license information stored in the license storage section 1303 is illegally changed, the damage can be reduced since the storage capacity of the DL application region DAR is limited.

Sixth Embodiment

In the sixth embodiment, as different from the first to fifth embodiments, the execution of the fee-charging software by the execution unit is controlled by the license managing unit.

The configuration of the microprocessor according to the sixth embodiment is similar to the configuration of the microprocessor explained in the fifth embodiment. A main difference is the license managing unit. In explanation with reference to FIG. 12, the microprocessor 1400 according to the sixth embodiment includes an execution unit 1401, a software storage unit 1402 and a license managing unit 1403. As similar to the fifth embodiment, the microprocessor 1400 according to the present embodiment includes not only the above-described units but also a plurality of units. However, those units are omitted here.

Moreover, also in the sixth embodiment, as similar to the fifth embodiment, the region (address space) AR of the software storage unit 1402 is divided into a user region UAR and a DL application region DAR as shown in FIG. 13, and microprocessors that are different from each other in the storage capacity ratio between the user region UAR and the DL application region DAR are provided by the seller (manufacturer) as shown in FIG. 14. The storage capacity ratio between the user region UAR and the DL application region DAR is determined by using the methods (1) to (6) explained in the first embodiment as similar to the fifth embodiment.

Figure 18:
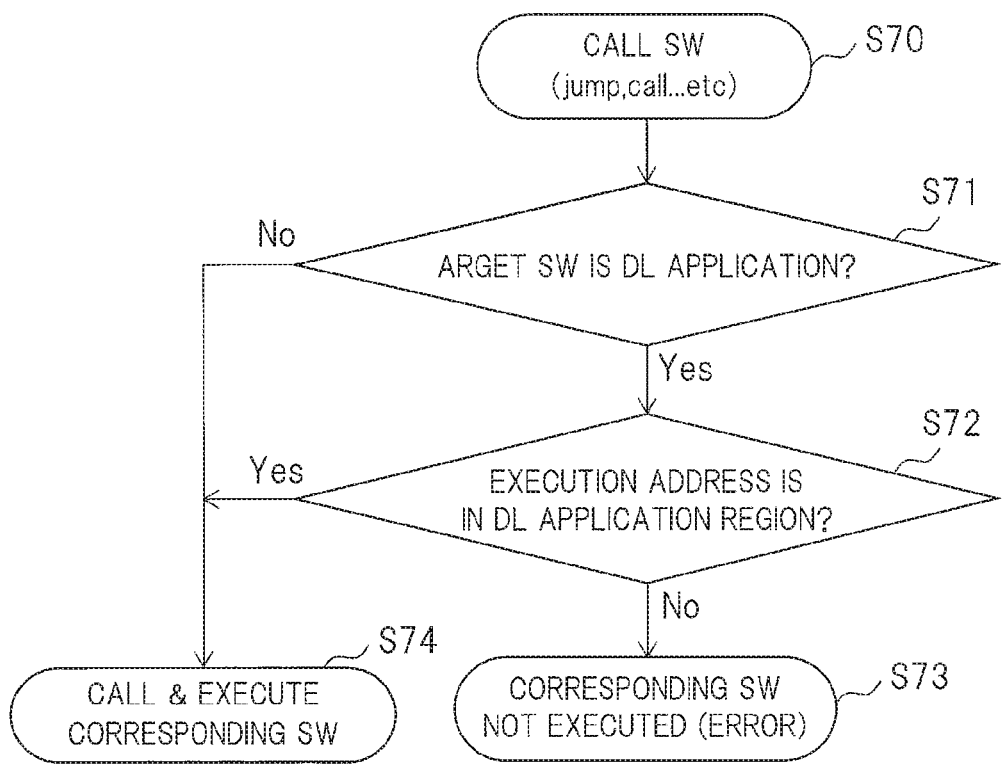
FIG. 18 is a flowchart showing an operation of a license managing unit according to a sixth embodiment.

Next, with reference to FIG. 18, the operation of the license managing unit 1403 according to the sixth embodiment will be explained. FIG. 18 is a flowchart showing the operation of the license managing unit 1403 according to the present embodiment.

In step S70, the execution unit 1401 reads (calls) software SW from the software storage unit 1402. For example, during the execution of predetermined software by the execution unit 1401, the software (SW) is called by a command (for example, jump command "jump", call command "call" or others) related to the calling.

The license managing unit 1403 determines in step S71 whether or not the software (target SW) called by the execution unit 1401 is the DL application (fee-charging software). It is determined whether or not it is the DL application as follows. That is, when the DL application is stored in the software storage unit 1402, information stored in the attribute information portion ATB of this software, such as a unique number ID, has been previously stored in the license managing unit 1403. At this time, the address of this software such as a starting address has been stored in the license managing unit 1403 so as to be corresponded to the unique number ID. In step S71, the license managing unit 1403 acquires the starting address of the software based on the command related to the calling, and searches the starting address stored in the license managing unit 1403 based on the acquired starting address. If the unique number ID corresponding to the starting address matched by the search is not found, it is determined that the software is the DL application (fee-charging software). If it is not found, it is determined that the software is not the DL application.

If it is determined in step S71 that the software is the DL application (Yes), the license managing unit 1403 executes step S72 next. On the other hand, if it is determined in step S71 that the software is not the DL application (No), the license managing unit 1403 executes step S74 next.

In step S72, the license managing unit 1403 determines whether or not an address (execution address) to be used when the execution unit 1401 executes the DL application indicates a portion inside the DL application region DRA. Here, as shown in FIG. 14, an area of the DL application region DRA is different depending on the type of each microprocessor (1400-1 to 1400-4). If it is determined in step S72 that the execution address is the portion inside the DL application region DRA (Yes), the license managing unit 1403 executes step S74 next. On the other hand, if it is determined in step S72 that the execution address is the portion outside the DL application region DRA (No), the license managing unit 1403 executes step S73 next.

In step S73, the license managing unit 1403 prohibits the execution of the corresponding software by the execution unit 1401. Moreover, in step S73, the license managing unit 1403 notifies the execution unit 1401 of the occurrence of the error.

In step S74, the license managing unit 1403 permits the execution unit 1401 to call and execute the corresponding software. Thus, the execution unit 1401 can execute the predetermined software.

If the called software is the DL application in step S70, step S72 is executed. If the execution address of the DL application is the portion inside the DL application region in step S72, the execution of the DL application by the execution 1401 is permitted in step S74. On the other hand, if the execution address of the DL application is the portion outside the DL application region, step S73 is executed. In this case, the execution of the DL application by the execution unit 1401 is prohibited. Moreover, if it is not the DL application, the execution by the execution unit 1401 is permitted in step S74.

In this manner, the execution of the DL application (fee-charging software) by the execution unit 1401 is controlled by the license managing unit 1403. Thus, for example, in an illegal operation such as the storage of the DL application (fee-charging software) in the user region UAR, the undesirable execution of the DL application can be prevented.

<Control by Hardware>

Figure 19:
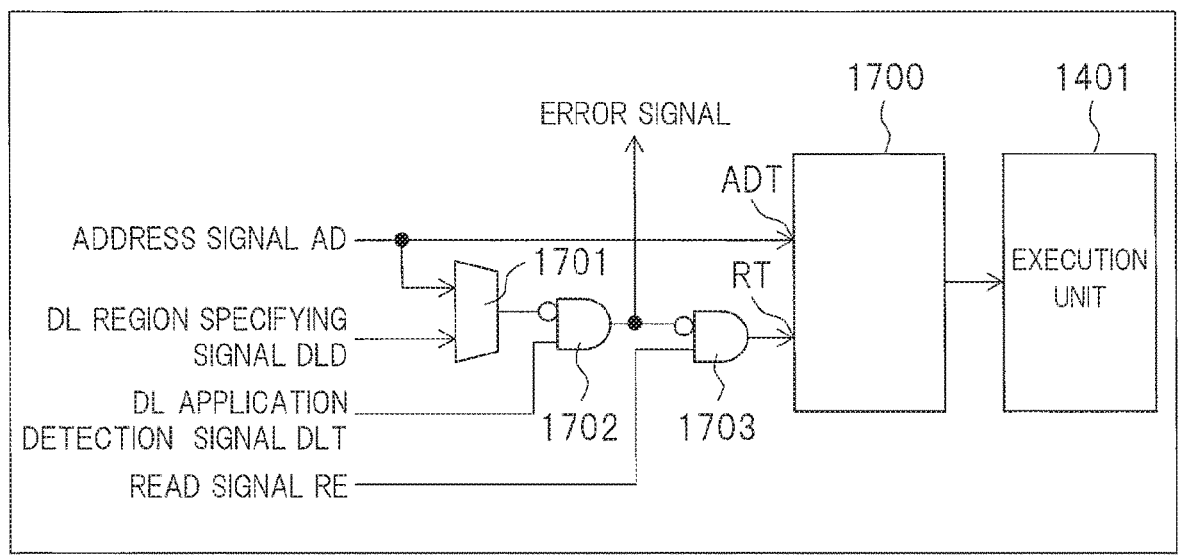
FIG. 19 is a block diagram showing a configuration in a case of control of execution of a DL application according to the sixth embodiment by hardware.

In FIG. 18, the example of the control for the execution of the DL application by the software has been explained. However, the control for the execution of the DL application may be achieved by hardware. That is, the execution may be controlled by using hardware such as a logic circuit. FIG. 19 is a block diagram showing a configuration in the case of the control by hardware.

In FIG. 19, reference numeral 1700 represents a flash memory. This flash memory 1700 corresponds to the software storage unit 1402. Therefore, the storage region of the flash memory 1700 forms the storage region AR of the software storage unit 1402, and the storage region of the flash memory 1400 is divided into the user region UAR and the DL application region DAR.

As explained in FIG. 16, the flash memory includes an address terminal, a write terminal, a read terminal and a data terminal. FIG. 19 shows the address terminal as ADT and the read terminal as RT. In FIG. 19, the write terminal and the data terminal are omitted.

From the flash memory 1700, the data stored in a region indicated by an address signal supplied to the address terminal ADT is read by supply of a read signal RE with a high level to the read terminal RT. The read data is supplied to the execution unit 1401 through the data terminal not shown. The execution unit 1401 executes the supplied data as a command. Thus, the microprocessor 1400 performs a predetermined operation.

The license managing unit 1403 outputs a DL region specifying signal DLD that specifies the DL application region DAR and a DL application detection signal DLT that indicates whether or not it is the DL application. Here, the DL region specifying signal DLD is an address signal indicating an area of the DL application region DRA allocated in the flash memory 1700. Moreover, the DL application detection signal DLT, which is a signal formed as explained in step S71 of FIG. 18, becomes the high level when it is the DL application, and also becomes the low level when it is not the DL application. Moreover, in FIG. 19, the address signal AD is formed by the execution unit 1401, and the read signal RE is also formed by the execution unit 1401.

In FIG. 19, reference numeral 1701 represents a comparison circuit, and the comparison circuit 1701 compares the address signal AD from the execution unit 1401 and the DL region specifying signal DLD from the license managing unit 1403 with each other. When the comparison shows that the region specified by the address signal AD is inside a region specified by the DL region specifying signal DLD, the comparison circuit 1701 sets the output signal to the high level. On the other hand, when the comparison shows that the region specified by the address signal AD is outside the region specified by the DL region specifying signal DLD, the comparison circuit 1701 sets the output signal to the low level.

The output signal of the comparison circuit 1701 is inverted in its phase and is supplied to one input of an AND circuit 1702. The DL application detection signal DLT is supplied to the other input of the AND circuit 1702, and the output signal of the AND circuit 1702 is inverted in its phase and is supplied to one input of an AND circuit 1703. Moreover, the output signal of the AND circuit 1702 is supplied to the execution unit 1401 as an error signal. A read signal RE from the execution unit 1401 is supplied to the other input of the AND circuit 1703, and the output signal of the AND circuit 1703 is supplied to the read terminal RT of the flash memory 1700.

When the execution unit 1401 executes the software, the execution unit 1401 outputs the execution address of the software as an address signal AD. Moreover, the read signal RE is set to the high level so as to read the software from the flash memory 1700.

When the address signal AD serving as an execution address output from the execution unit 1401 specifies a portion inside the region defined by the DL region specifying signal DLD, an output signal with the high level is output from the comparison circuit 1701. To one input of the AND circuit 1702, this high level is inverted in its phase so that the low level is supplied. As a result, the output signal of the AND circuit 1702 becomes the low level. When the error signal is with the high level, the execution unit 1401 recognizes the occurrence of the error. Therefore, in a state with the supply of the error signal with the low level, it recognizes no occurrence of the error.

The output signal with the low level output from the AND circuit 1702 is inverted in its phase again, and is supplied to one input of the AND circuit 1703. At this time, the execution unit 1401 sets the read signal to the high level so as to read the software. As a result, the AND circuit 1703 supplies the output signal with the high level to the read terminal RT of the flash memory 1700. Thus, the flash memory 1700 supplies the data stored in the region specified by the address signal AD serving as the execution address to the execution unit 1401. The execution unit 1400 executes the supplied data as a command of the software.

Thus, the DL application (fee-charging software) can be read from the region specified by the DL region specifying signal DLD, and the execution unit 1401 can execute the application.

On the other hand, when the address signal AD from the execution unit 1401 specifies a portion outside the region specified by the DL region specifying signal DLD, the output signal from the comparison circuit 1701 becomes the low level. When the DL application detection signal DLT is the high level, the output signal of the AND circuit 1702 becomes the high level. As a result, the execution unit 1401 recognizes the occurrence of the error. Moreover, since the output signal of the AND circuit 1702 becomes the high level, the output signal of the AND circuit 1703 becomes the low level. That is, the read signal with the low level is supplied to the read terminal RT of the flash memory 1700. As a result, no data is output from the flash memory 1700, so that the supply of the software to the execution unit 1401 is stopped. That is, the execution of the DL application (fee-charging software) by the execution unit 1401 is prohibited.

In this manner, if the DL application (fee-charging software) is read from the region specified by the DL region specifying signal DLD, the execution by the execution unit 1401 is permitted. If it is read from the portion outside the region specified by the DL region specifying signal DLD, the execution by the execution unit 1401 is prohibited.

Figure 20:
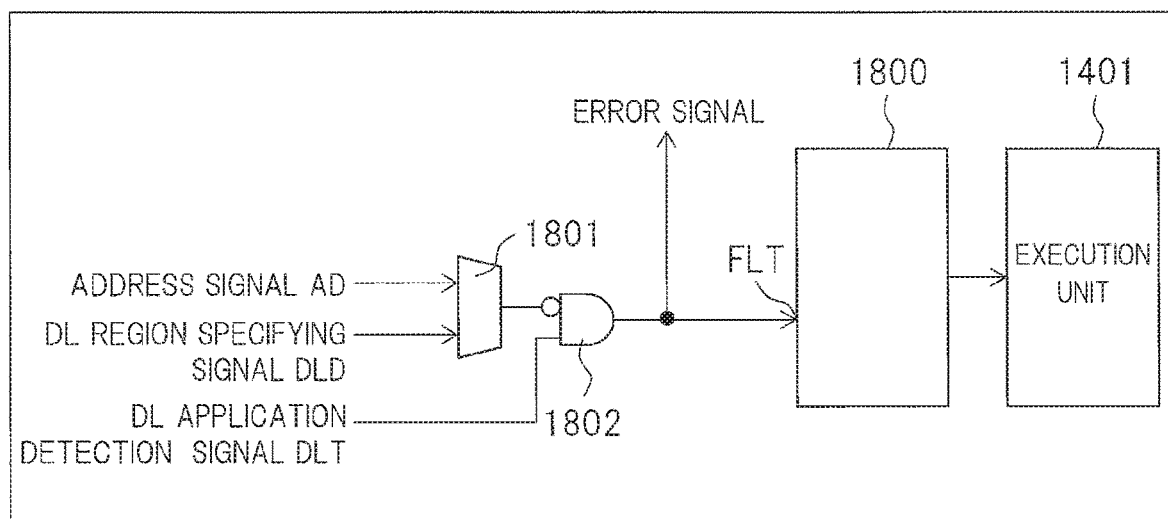
FIG. 20 is a block diagram showing another configuration in the case of control of execution of the DL application according to the sixth embodiment by hardware.

FIG. 20 is a block diagram showing another configuration in the case of the control for the execution of the DL application by hardware.

In FIG. 20, reference numeral 1800 represents a command queue. In the command queue 1800, commands from the software storage unit 1403 are successively stored, and are supplied to the execution unit 1401. The command queue 1800 includes a flash terminal FLT. By supply of a flash signal with a high level to this flash terminal FLT, all the commands stored in the command queue 1800 are erased. In FIG. 20, note that a passage from the software storage unit 1402 to the command queue 1800 is omitted.

The address signal AD, the DL region specifying signal DLD, the DL application detection signal DLT and the error signal shown in FIG. 20 are the same as those signals shown in FIG. 19, respectively, and therefore, the explanations thereof will be omitted.

In FIG. 20, reference numeral 1801 represents a comparison circuit, and the comparison circuit 1801 compares the address signal AD from the execution unit 1401 and the DL region specifying signal DLD with each other. If the address signal AD specifies a portion outside the region specified by the DL region specifying signal DLD, the comparison circuit 1801 outputs an output signal with a low level. On the other hand, if the address signal AD specifies a portion inside the region specified by the DL region specifying signal DLD, the comparison circuit 1801 outputs an output signal with a high level. The output signal of the comparison circuit 1801 is inverted in its phase, and is supplied to one input of an AND circuit 1802, and the DL application detection signal DLT is supplied to the other input of the AND circuit 1802. The output signal of the AND circuit 1802 is supplied to the flash terminal FLT of the command queue 1800 as a flash signal, and is also supplied to the execution unit 1401 as an error signal.

If the execution unit 1401 executes the DL application (fee-charging software), the DL application detection signal DLT becomes the high level. If the execution unit 1401 reads the DL application to be executed from the portion outside the DL application region DAR, that is, from the user region UAR, the address signal AD specifies a portion outside the region specified by the DL region specifying signal DLD. As a result, the output signal of the comparison circuit 1801 becomes the low level, and the output signal of the AND circuit 1802 becomes the high level. That is, the flash signal becomes the high level so that all the commands stored in the command queue 1800 are erased. Thus, the execution of the DL application by the execution unit 1401 is prohibited. Moreover, since the error signal becomes the high level at this time, the execution unit 1401 can recognize the occurrence of the error.

On the other hand, if the execution unit 1401 reads the DL application from the DL application region DAR, the address signal AD specifies the portion inside the region specified by the DL region specifying signal DLD. As a result, the output signal of the comparison circuit 1801 becomes the high level so that a flash signal with a low level is supplied to the flash terminal FLT of the command queue 1800, and an error signal with a low level is supplied to the execution unit 1401. Thus, the commands stored in the command queue 1800 are not erased, are supplied to the execution unit 1401 and are executed. That is, the execution of the DL application (fee-charging software) by the execution unit is permitted. Moreover, since the error signal is the low level, the execution unit 1401 can recognize no occurrence of the error.

In the example shown in FIG. 20, the execution of the DL application by the execution unit 1401 is prohibited by erasing the commands stored in the command queue 1800.

When the execution unit 1401 recognizes the occurrence of the error from the error signal, it executes an error handling software. By executing the error handling software, various error countermeasure can be performed. For example, the example shown in FIG. 20 has explained that all the commands stored in the command queue 1800 are erased when the error has occurred. However, by using the error handling software, various countermeasure can be performed. For example, a valid bit indicating whether or not the stored command is valid may be provided in the command queue 1800, and the valid bit may be changed to "invalid" indicating that the command is invalid by executing the error handling software. Moreover, in the command queue 1800, updating of a write pointer that specifies a location where the command is stored may be stopped by executing the error handling software.

Explanations have been made while exemplifying the microprocessor 1401 as the semiconductor device. However, the semiconductor device is not limited to this.

Moreover, in place of the microprocessor 1401, a personal computer or a portable terminal such as a smartphone may be used. Moreover, in place of the flash writer 1105, an optical disc reproduction device or a software storage device that supplies the fee-charging software through a communication line may be used. Furthermore, the software storage unit 1402 may use a hard disc or a memory card. Even if the microprocessor, the flash writer and the software storage unit are changed as described above, the same effects can be obtained.

First Modified Example

The sixth embodiment is combined with, for example, the first embodiment or the second embodiment. That is, the license storage unit 1103 shown in FIG. 2 (license storage section 1305 shown in FIG. 6) is added to the configuration explained in the sixth embodiment. In this case, by the license managing unit 1403, the license information stored in the license storage unit 1103 is updated, and the number of installable times of the fee-charging software indicated by the license information is also confirmed.

As a result, by both of the number of installable times and the storage capacity of the DL application region DAR, the storage of the software into the DL application region DAR inside the software storage unit 1402 is controlled. In this case, even if, for example, the license information stored in the license storage section 1303 is illegally changed, the damage can be reduced since the storage capacity of the DL application region DAR is limited.

Second Modified Example

The sixth embodiment is combined with the fifth embodiment. Thus, in both of the download of the DL application and the execution of the DL application, it can be checked whether or not the download and the execution are illegally performed, so that a stricter countermeasure against the illegal operation is possible.

Third Modified Example

The sixth embodiment is combined with the first embodiment or the second embodiment, and the fifth embodiment. Thus, the damages caused by the illegal operation can be reduced, and a stricter countermeasure against the illegal operation is possible.

Seventh Embodiment

In the fifth embodiment and sixth embodiment, a part of the region AR in the software storage unit 1402 is allocated to the DL application region DAR, and a region except for the DL application region DAR is allocated to the user region UAR. In the present seventh embodiment, when the software in the user region UAR is being executed by the execution unit 1401, an access to the DL application region DAR is limited.

Figure 21:
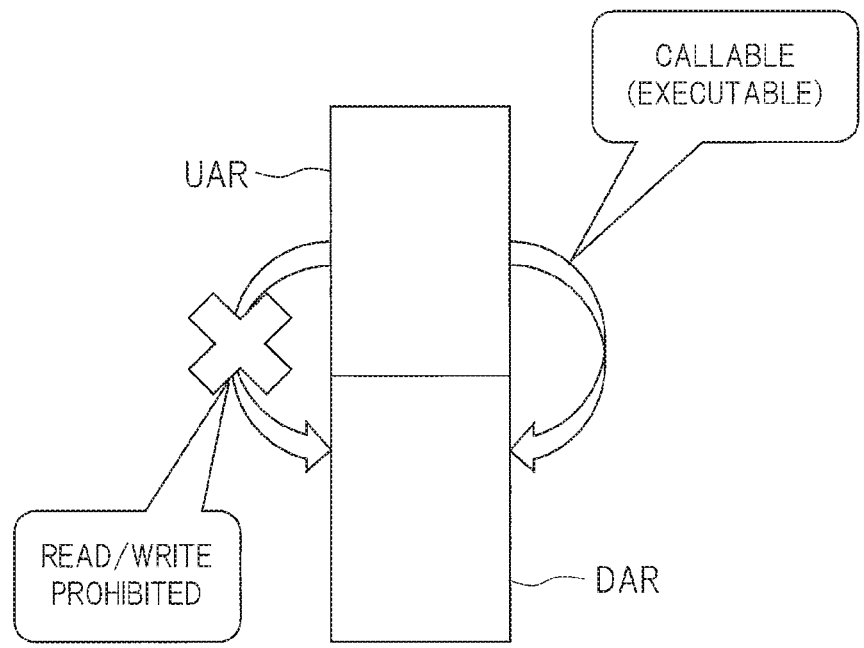
FIG. 21 is a conceptual drawing showing an operation of a microprocessor according to a seventh embodiment.

FIG. 21 is a conceptual diagram showing an operation of a microprocessor according to the seventh embodiment. When the execution unit 1401 executes the software in the user region UAR, writing and reading operations of the data to and from the DL application region DAR are prohibited. In this case, by the software in the user region UAR, the software in the DL application region DAR can be executed.

In this manner, by the execution of the software in the user region UAR, an analysis and/or copying of the software stored in the DL application region DAR can be prevented. As a result, protection (prevention of the analysis and the copying) of the fee-charging software stored in the DL application region DAR can be achieved.

According to the seventh embodiment, the analysis and the copying of the software can be prevented even if the microprocessor is not provided with a high function (high cost) such as a memory management function (MMU) or a memory protection function. That is, when the DL application region DAR and the user region UAR are allocated in provision of the microprocessor, it is only required to set the access limitation as described above, so that security can be enhanced at a low cost.

When the software in the DL application region is executed, note that the data can be written and read to and from the user region UAR. Moreover, the data is passed between the software in the user region UAR and the software in the DL application region by using a region of the user region UAR or a register included in the execution unit 1401.

As shown in FIG. 21, a configuration capable of the execution of the software while prohibiting the reading and the writing of the data may be achieved by, for example, when a program counter included in the execution unit 1401 accesses the DL application region DAR, permitting this access, and by prohibiting this access in other cases.

Eighth Embodiment

In the fifth embodiment and the sixth embodiment, a part of the region AR of the software storage unit 1402 is allocated to the DL application region DAR, and the region except for the DL application region DAR is allocated to the user region UAR. In the present eighth embodiment, a data-use storage unit used for primarily storing data is also divided into a DL application-use portion and a user-use portion.

Figure 22:
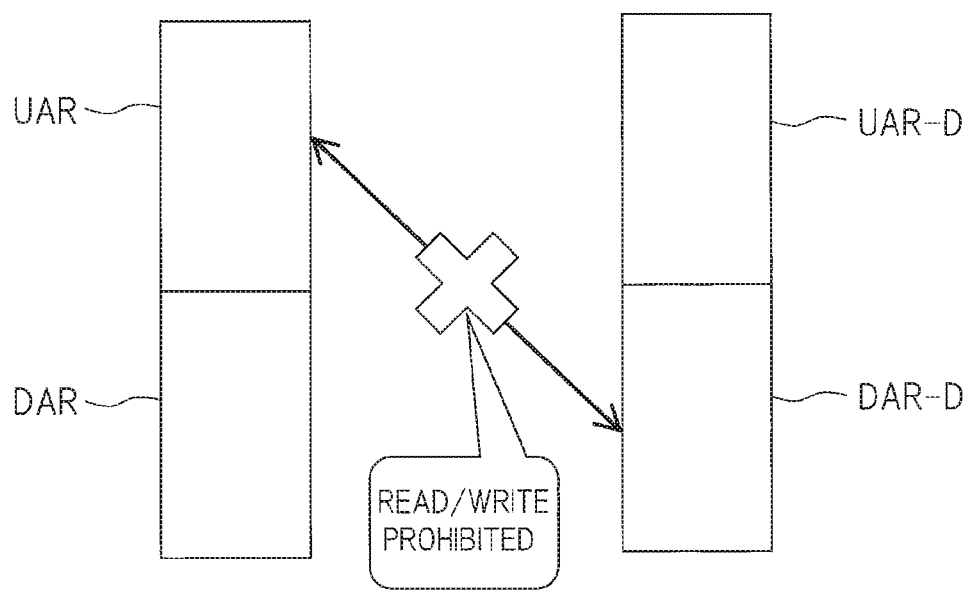
FIG. 22 is a conceptual drawing showing an operation of a microprocessor according to an eighth embodiment.

FIG. 22 is a conceptual diagram showing an operation of a microprocessor according to the eighth embodiment. In FIG. 22, reference character DAR-D represents a DL application-use data region, reference character UAR-D represents a user-use data region, and the data-use storage unit is divided into the DL application-use data region DAR-D and the user-use data region UAR-D. In the present eighth embodiment, when the execution unit 1401 executes the software in the user region UAR, writing and reading of data to and from the DL application-use data region DAR-D are prohibited. On the other hand, when the execution unit 1401 executes the software in the DL application region DAR, writing and reading operations of data to and from the user-use data region UAR-D are permitted.

Thus, by executing the software in the user region UAR, the illegal analysis and/or copying of data in the DL application-use data region DAR-D can be prevented, so that the fee-charging software can be more strictly protected as similar to the seventh embodiment. Moreover, as similar to the seventh embodiment, security can be enhanced at a low cost.

As the DL application-use data region DAR-D and the user-use data region UAR-D, note that a static-type memory embedded into the microprocessor 1400 may be used, or a volatile memory mounted outside the microprocessor 1400 may be used.

Obviously, the seventh embodiment and the eighth embodiment may be combined with each other for use, or may be separately used.

Ninth Embodiment

Figure 24:
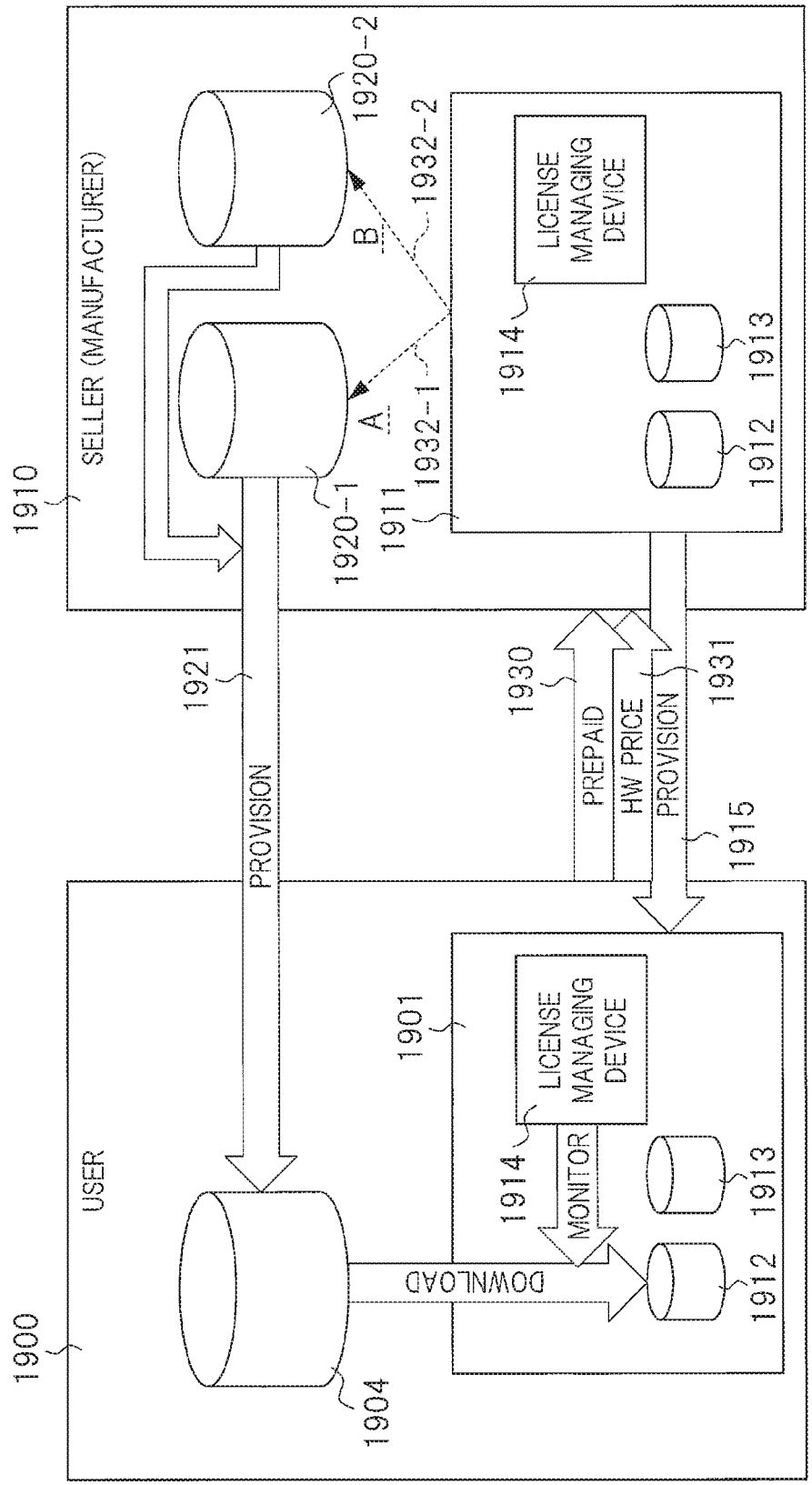
FIG. 24 is a system diagram showing a configuration of a license fee collection system according to a ninth embodiment.

A ninth embodiment provides a license fee collection system that collects a license fee by using the semiconductor device and the electronic apparatus explained in the first to eighth embodiments. FIG. 24 is a system diagram showing a configuration of the license fee collection system. In the system shown in FIG. 24, the seller and/or manufacturer provides the fee-charging software and the semiconductor device or the electronic apparatus to the user, and the seller and/or manufacturer collects the prices of them from the user. Therefore, FIG. 24 can be considered to show a business model between the seller (manufacturer) and the user. In this case, the number of the seller and/or manufacturer may be plural.

In FIG. 24, reference numeral 1900 represents the user, and reference numeral 1910 represents the seller and/or a manufacturer. To the user 1900, the seller (manufacturer) 1910 provides the fee-charging software and the semiconductor device (microprocessor) or the electronic apparatus explained in the first to eighth embodiments. In the same drawing, reference numeral 1911 represents a device that is manufactured and sold by the seller (manufacturer) 1910, and reference numeral 1901 represents a device that is provided (1915) from the seller (manufacturer) 1910 to the user 1900. Here, the semiconductor device and the electronic apparatus explained in the first to eighth embodiments are generally referred to as "device". That is, each of the devices 1901 and 1911 described here is the semiconductor device or electronic apparatus explained in the embodiments.

In FIG. 24, each of reference numerals 1920-1 and 1920-2 represents the fee-charging software. The fee-charging software 1920-1 and/or 1920-2 is provided (1921) from the seller (manufacturer) to the user 1900 in response to, for example, a request from the user 1900. Here, for convenience of explanation, a case of provision (1915, 1921) of the device 1911 and the fee-charging software 1920-1 and 1920-2 by the same seller (manufacturer) will be explained first. However, obviously, the seller (manufacturer) who provides the device 1911 and the seller (manufacturer) who provides the fee-charging software 1920-1 and 1920-2 are not necessarily the same as each other. Moreover, the fee-charging software 1920-1 and 1920-2 may be provided by different sellers (manufacturers) from each other. Furthermore, at least one piece of the plurality of pieces of fee-charging software 1920-1 and 1920-2 may be provided by the seller (manufacturer) who provides the device 1911.

In FIG. 24, the configuration of each of the devices 1901 and 1911 has the configuration explained in the first to eighth embodiments. However, this drawing illustrates only configurations that are needed in the explanation, and the other configurations are omitted. In the same drawing, reference numeral 1912 represents a software storage device, reference numeral 1913 represents a license storage device, and reference numeral 1914 represents a license managing device. Also here, the software storage device 1912 is used as a generic term for the software storage section (1002 in FIG. 1) and the software storage unit (1102 in FIG. 2) explained in the embodiments. Moreover, the license storage device 1913 is used as a generic term for the license storage section (1003 in FIG. 1) and the license storage unit (1103 in FIG. 2). Similarly, the license managing device 1914 is used as a generic term for the license managing section (1004 in FIG. 1) and the license managing unit (1104 in FIG. 2).

Before supplying the device 1911 to the user 1900, the seller (manufacturer) 1910 stores the license information explained in the embodiments in the license storage device 1913. When the seller (manufacturer) provides the device 1911 to the user 1900, the device 1911 including the license storage device 1913 that has stored the license information is supplied (1915). As explained in the embodiments, the license information that is stored in the license storage device 1913 by the seller (manufacturer) 1910 is information indicating the number of installable times of the fee-charging software, the installable points, the installable storage capacity, or others.

At this time, the seller (manufacturer) 1910 determines the price of the device 1911 to be provided to the user 1900, that is, the selling price thereof, so as to add a license fee corresponding to an installable amount indicated by the license information, that is, corresponding to the number of licenses to the hardware price (HW price) of the device 1911. That is, the seller (manufacturer) 1910 provides (1915) the device 1911 to the user 1900 at the selling price determined by adding (summing) the license fee corresponding to the number of licenses to the HW price of the device 1911. In this case, the selling price is changed by the license information stored in the license storage device 1913.

After purchasing the device 1911, the user 1900 downloads the fee-charging software into the purchased device (in FIG. 24, the purchased device is indicated as 1901) through a software providing device 1904, if necessary in order to achieve functions that are desired by the user 1900. In this case, as explained in the first to eighth embodiments, the downloading of the fee-charging software, that is, the storage or the execution into the software storage device 1912, is permitted by the license managing device 1914 until the number of download (storage or execution) times reaches the number of licenses indicated by the license information stored in the license storage device 1913. Therefore, the user 1900 pays the license fee required for the permission of the fee-charging software before the downloading. Note that FIG. 24 shows that the license managing unit 1914 monitors the downloading in order to permit the downloading until the number of download times reaches the number of licenses indicated by the license information.

When the number of the download times exceeds the number of licenses indicated by the license information, the license managing device 1914 limits the downloading or the execution. Therefore, the license information can be also considered to be the limitation information for limiting the downloading or the execution.

That is, in the present embodiment, the license fee is prepaid. Therefore, the user 1900 pays the hardware price (HW price) 1931 of the device together with the prepaid price 1930 (described as "prepaid" in FIG. 24) of the license fee as the purchase price for the provision (1915) of the device 1911 from the seller (manufacturer) 1910. Here, note that the selling price determined by the seller (manufacturer) 1910 is supposed to be the same as the purchase price paid by the user 1900.

An example of change of the selling price (purchase price) depending on the license information stored in the license storage device 1913 will be explained below.

First, explanations will be made while exemplifying a case in which the license information indicates the number of installable times of the fee-charging software. Here, it is supposed that the hardware price (HW price) of the device 1911 is, for example, 10 dollars, and that the fee-charging software per piece is priced at 30 dollars. In this case, the selling price of the device 1911, that has stored the license information indicating that the number of installable times of the fee-charging software is 0, becomes 10 dollars. Meanwhile, the selling price of the device 1911 that has stored the license information indicating that the number of installable times of the fee-charging software is 1 becomes 40 dollars, and the device 1911 that has stored the license information indicating that the number of installable times of the fee-charging software is 2 becomes 70 dollars. Hereinafter, as the number of installable times of the fee-charging software is increased by 1, the selling price of the device 1911 is increased by 30 dollars.

Moreover, a case in which the license information indicates the installable point of the fee-charging software will be explained. Also here, it is supposed that the hardware price (HW price) of the device 1911 is 10 dollars, and that 1 point is priced at 1 dollar. In this case, the selling price of the device 1911, that has stored the license information indicating that the number of points is 0, becomes 10 dollars. Meanwhile, the selling price of the device 1911 that has stored the license information indicating that the number of points is 50 becomes 60 dollars, and the device 1911 that has stored the license information indicating that the number of points is 100 becomes 110 dollars. Hereinafter, as the number of points is increased by 1, the selling price of the device 1911 is increased by 1 dollar. In this case, when the number of points required for license permission for one piece of the fee-charging software is, for example, 50 points, the download of one piece of the fee-charging software is permitted for the device 1911 whose selling price is 60 dollars, and the downloading of two pieces of the fee-charging software is permitted for the device 1911 whose selling price is 110 dollars. The downloading of pieces of the fee-charging software larger than the permitted number of pieces is failed. That is, the downloading is limited.

Furthermore, a case in which the license information indicates the installable storage capacity of the fee-charging software (storage capacity of the DL application region DAR) will be explained. Also here, it is supposed that the hardware price (HW price) of the device 1911 is 10 dollars. In this case, all the region (address space) AR of the software storage device 1912 can be considered to be allocated to the user region UAR. It is supposed that, for example, the selling price is 60 dollars when 1 M bit (1 MB) is allocated to the DL application region DAR of the region AR of the software storage device 1911, the selling price is 110 dollars when 2 M bits (2 MB) are allocated to the DL application region DAR, and the selling price is 210 dollars when 4 M bits (4 MB) are allocated to the DL application region DAR. In this manner, as the storage capacity is increased by, for example, 1 M bit, the price is increased by, for example, 50 dollars. In this case, the fee-charging software can be downloaded until the storage capacity allocated to the DL application region DAR becomes insufficient due to the fee-charging software. The number of pieces of the fee-charging software downloaded until the insufficiency occurs in the DL application region DAR becomes the number of licenses indicated by the license information, and the license fee corresponding to the number of licenses is to be prepaid.

In terms of the license fee collection system, the license information corresponds to the prepaid license fee. That is, the license information indicates a value corresponding to the prepaid license fee. As one example, the number of installable times of the fee-charging software indicated by the license information changes in accordance with the prepaid license fee. The license managing device 1914 permits the storage or the execution of the fee-charging software if the license fee indicated by the license information at the time of the storage or the execution of the fee-charging software satisfies the license fee of this fee-charging software, that is, if the license fee of this fee-charging software can be paid. Moreover, when the license managing device 1914 has permitted the storage or the execution of the fee-charging software, it reduces the license fee of the fee-charging software from the charge (license fee) indicated by the license information, and stores the license information corresponding to the license fee obtained by the reduction in the license storage device.

Moreover, as described in the first embodiment, when the fee-charging software is uninstalled, the license managing device 1914 can update the license information. In terms of the license fee collection system, this operation means that the license information is stored in the license storage device, the license information corresponding to a license fee obtained by adding the license fee of the uninstalled fee-charging software to the charge (license fee) indicated by the license information stored in the license storage device at that time.

As shown in FIG. 14, when the region AR of the software storage device is divided into the DL application region DAR (first storage region) and the user region (second region) UAR, the prepaid license fee becomes more expensive as the first storage region becomes larger, and therefore, the device becomes more expensive as the first storage region becomes larger.

There are various methods of the provision (1921) of the fee-charging software from the seller (manufacturer) 1910 to the user 1900. When the seller (manufacturer) provides (1921) the fee-charging software, it is not required to request the user 1900 to pay the price of the fee-charging software. This is because, when the user 1900 purchases the device 1911, a charge (license fee) corresponding to the fee-charging software that can be downloaded to the device 1911 is included in the selling price of the device 1911, and has been prepaid to the seller (manufacturer). Therefore, as the method of the provision (1921) of the fee-charging software, various methods can be adopted.

For example, the seller (manufacturer) 1910 stores the pieces 1920-1 and 1920-2 of the fee-charging software in a storage medium such as an optical disc, and provides (1921) the storage medium such as the optical disc to the user 1910. In this case, the software providing device 1904 is configured by, for example, an optical disc reproduction device. The user 1900 reproduces the provided optical disc by using this optical disc reproduction device, so that the user provides the fee-charging software to the purchased device 1901. Obviously, the license fee for permitting the license of the fee-charging software is only prepaid, and a payment request by the seller (manufacturer) 1910 to the user 1900 for the cost of the storage medium such as the optical disc and the cost required for the storage is not limited.

Moreover, the pieces 1920-1 and 1920-2 of the fee-charging software may be previously stored in a server device provided on the seller (manufacturer) 1910 side, and the user 1900 may acquire the fee-charging software from the server device on the seller (manufacturer) 1910 side through a communication line such as the Internet, and may provide the fee-charging software to the device 1901. In this case, the software providing device 1904 includes, for example, a server device on the user 1900 side, and the fee-charging software is downloaded from the server device on the user 1900 side to the device 1901.

For example, when the user 1900 manufactures a product, on which the purchased device 1901 is mounted, through an assembly line in a factory, it is considered that the assembly line in the factory includes a process of installing the fee-charging software. In this case, a manufacturing device (for example, a flash writer, ROM writer or others) or an information processing device such as a personal computer connected to the manufacturing device in the installing process is defined as the software providing device 1904, and the pieces 1920-1 and 1920-2 of the fee-charging software are stored in the software providing device 1904. The stored pieces 1920-1 and 1920-2 of the fee-charging software are provided to the device 1901 in the installing process. In this case, it is not particularly required to limit the storage of the fee-charging software to the manufacturing device and/or the information processing device. Therefore, for example, by allowing the user 1900 to previously store the fee-charging software in the manufacturing device and/or the information processing apparatus through a communication line, it is not required to download the fee-charging software every time the fee-charging software is downloaded to the device 1901. Moreover, also when the user 1900 increases the number of the assembly lines in accordance with a plan for manufacturing the product, the user can copy and use the previously-stored fee-charging software. On the other hand, when the number of the assembly lines is decreased, the excessive pieces of the software can be freely disposed. Therefore, time and effort of the user 1900 can be reduced, and complexity can be reduced.

As described in the first to eighth embodiments, the device 1901 purchased by the user 1900 can download the pieces of the fee-charging software undesirably only until the number of download times reaches the number of licenses indicated by the license information. In other words, the device 1901 can download only the number of pieces of the fee-charging software that is the number of licenses depending on the purchased price (selling price), and the downloading of the number of pieces of the fee-charging software that exceeds the number of licenses is limited. Therefore, the user 1900 cannot download the fee-charging software into the device 1901 without paying the license fee for permission of the license, so that the seller (manufacturer) 1910 can exactly collect the license fee.

For the user 1900, a process for separately paying the license fee in accordance with the number of the manufactured products is unnecessary.

Moreover, regardless of the number of installs of the fee-charging software, the user 1900 does not need to pay a certain license fee. If it is required to pay the certain license fee, it becomes expensive for a user having a small number of the installs. According to the present embodiment, since such a procedure as to pay the certain license fee is not required regardless of the number of installs, the expensive license fee can be prevented.

Moreover, the user 1900 does not need to introduce an expensive license managing device, and it is only required to provide the above-described manufacturing device and/or information processing apparatus in the manufacturing line, and therefore, the loads on the user can be reduced. Furthermore, the seller (manufacturer) 1910 does not need to monitor whether or not the license managing device introduced by the user 1900 is appropriately operated, and therefore, the loads on the seller (manufacturer) can be also reduced.

The license fee has been prepaid, and such installing of the fee-charging software as exceeding the prepaid license fee is limited by the license managing device 1914. Therefore, as the fee-charging software providing method, various methods can be adopted. For example, the license can be managed without using a communication line such as the Internet. Moreover, the illegal use of the fee-charging software without permission can be prevented, and missing of the collection of the license fee can be prevented.

Explanations have been made about the case of the provision of the pieces 1920-1, 1920-2 of the fee-charging software and the device 1911 to the user 1900 by the same seller (manufacturer) 1910. However, the present invention is not limited to this. A provider (software distribution source) that provides the pieces 1920-1 and 1920-2 of the fee-charging software to the user 1900 and a provider (seller, manufacturer) that provides the device 1911 to the user 1900 may be different from each other.

For example, a software distribution source (provider) A may provide the fee-charging software 1920-1 to the user 1900, a software distribution source (provider) B may provide the fee-charging software 1920-2 to the user 1900, and a seller and/or manufacturer (provider) 1910 may provide the device 1911 to the user 1900. That is, this is a case in which the distribution source that provides the fee-charging software is different from the seller (manufacturer) that provides the device 1911.

Also in this case, the seller (manufacturer) 1910 stores the license information that is the information corresponding to the number of licenses, and sells the device 1911 to the user 1900. To the seller (manufacturer) 1910, the user 1900 pays the price (selling price, purchased price) obtained by adding the license fee (prepaid price 1930) corresponding to the number of licenses indicated by the license information to the hardware price (HW price 1931) of the device 1911. The seller (manufacturer) 1910 distributes a part of the license fee (prepaid price 1930) of the price paid by the user 1900 as a license fee 1932-1 of the fee-charging software 1920-1 to the software distribution source A, and distributes the remaining license fee as a license fee 1932-2 of the fee-charging software 1920-2 to the software distribution source B. Thus, each of the software distribution sources A and B can collect the license fee as the price of the fee-charging software.

As a distribution ratio at the time of distributing the license fee (prepaid price 1930), note that a fixed ratio may be set, or for example, an amount of money distributed for the previously-confirmed popular fee-charging software among the users 1900 may be set to high.

In this case, the software distribution sources A and B do not need to monitor the license managing device introduced onto the user 1900 side as similar to the seller (manufacturer) 1910, and therefore, the loads can be reduced. Moreover, the missing of the collection of the license fee can be prevented.

Obviously, for example, when the software distribution source B is the seller (manufacturer) 1910, it is required to distribute only the license fee 1932-1 to the software distribution source A.

The electronic apparatus explained in the first to ninth embodiments can be considered to be the electronic apparatus including the download managing function that manages the downloading of the fee-charging software based on the license information. When it is considered to be the electronic apparatus including the download managing function, the download charging system that requires the license fee that is the price of the fee-charging software can be considered to be described in the present specification. When such consideration is made, in the download charging system, the license information corresponding to the license fee is previously stored in the license storage unit. Based on the stored license information, the storage of the fee-charging software into the software storage unit is controlled so that the execution of the fee-charging software whose license is permitted by the license fee indicated by the previously-stored license information can be permitted.

Moreover, the semiconductor device (microprocessor) explained in the first to ninth embodiments can be considered to be a semiconductor device including a download managing function that manages the downloading based on the license information. When it is considered to be the semiconductor device including the download managing function, the download charging system can be considered to be described in the present specification. When such consideration is made, in the download charging system, the license information corresponding to the license fee is previously stored in the license storage unit. Based on the stored license information, the storage of the fee-charging software to the software storage unit or the execution of the fee-charging software is controlled so that the execution of the fee-charging software whose license is permitted by the license fee indicated by the previously-stored license information can be permitted. Here, based on the stored license information, the control of the storage of the fee-charging software into the software storage unit is executed as described in, for example, the first to fifth embodiments. Moreover, based on the stored license information, the control of the execution of the fee-charging software is executed as described in, for example, the sixth embodiment.

In the present specification, as used in the ninth embodiment, in some cases, the execution unit and the execution section are collectively referred to as an execution device, the software storage unit and the software storage section are collectively referred to as a software storage device, the license storage unit and the license storage section are collectively referred to as a license storage device, and the license managing unit and the license managing section are collectively referred to as a license managing device.

In the present specification, a license managing method of managing the license of the fee-charging software can be considered to be disclosed. In this case, the license managing method includes an execution device and a software storage device. This license managing method can be considered to include a process (license managing process) of controlling the storage of the fee-charging software to be downloaded into the software storage device or the execution of the fee-charging software based on the license information stored in the license managing device at the time of the downloading of the fee-charging software. By controlling the storage or the execution based on the license information in the license managing process, the execution of the fee-charging software whose license is permitted by a license fee indicated by the license information can be permitted. Also here, the control of the storage of the fee-charging software into the software storage unit based on the stored license information is described in, for example, the first embodiment and the fifth embodiment. Moreover, the control of the execution of the fee-charging software based on the stored license information is described in, for example, the sixth embodiment.

Moreover, in terms of the license managing method, since the seller (manufacturer) stores the license information into the license storage device, the storage corresponds to a process (storage process) prior to the license managing process.

When the license information is considered to be the information indicating the number of licenses of the fee-charging software that can be stored in the software storage device, the number of licenses can be considered to be reduced by the license managing device every time the fee-charging software is stored. When such consideration is made, the uninstalling can be considered to increase or maintain the license number. Moreover, when the license information is considered to be information indicating the number of licenses of the fee-charging software that can be executed by the execution device, the number of licenses can be considered to be reduced by the license managing device because of the increase in the number of pieces of the executable fee-charging software.

<Statement>

The present specification has disclosed a plurality of inventions, and some of them are described in claims. However, the present specification has also disclosed other inventions, and typical ones of the inventions are described below.

(A) In a download charging system using an electronic apparatus including a download managing function, the electronic apparatus includes: an execution section that executes software; a software storage section coupled to the execution section; a license storage section that stores license information indicating the number of licenses for permitting a license of the software; and a license managing section that controls storage of the software to be downloaded into the software storage section based on the license information stored in the license storage section at the time of downloading of software whose license permission is required. The license information indicating the number of licenses for permitting the license is previously stored into the license storage section, and the storage of the software whose license permission is required into the software storage section is controlled based on the stored license information.

(B) In the download charging system described in (A), the license information indicating the number of licenses for permitting licenses of a plurality of pieces of software is previously stored into the license storage section, and the license managing section stores pieces of software whose license permissions are required into the software storage section until the number of storage times reaches the number of licenses indicated by the previously-stored license information.

(C) In the download charging system described in (B), at the time of storage of the software whose license permission is required into the software storage section, the license managing section decreases the number of licenses indicated by the license information.

(D) In the download charging system described in (C), at the time of uninstall of the software whose license permission is required, the license managing section increases the number of licenses indicated by the license information.

(E) In the download charging system described in (C), at the time of uninstall of the software whose license permission is required, the license managing section maintains the number of licenses indicated by the license information.

(F) In a download charging system using a semiconductor device including a download managing function, the semiconductor device includes: an execution unit that executes software; a software storage unit coupled to the execution unit; a license storage unit that stores license information indicating the number of licenses for permitting a license of the software; and a license managing unit that controls storage of the software to be downloaded into the software storage unit or execution of the software by the execution unit based on the license information stored in the license storage unit at the time of downloading of software whose license permission is required. The license information is previously stored into the license storage unit, and the storage of the software whose license permission is required into the software storage unit or the execution of the software by the execution unit is controlled based on the stored license information.

(G) In the download charging system described in (F), the semiconductor device is provided so that the license information indicating the number of licenses for permitting licenses of a plurality of pieces of software is previously stored into the license storage unit, and the license managing unit permits storage of pieces of software whose license permissions are required into the software storage unit or execution of the software by the execution unit until the number of storage or execution times reaches the number of licenses indicated by the previously-stored license information.

(H) A license managing system includes: an execution section that executes software; a software storage section coupled to the execution section; a license storage section that stores license information; and a license managing section that controls storage of the software whose license permission is required into the software storage section based on the license information. The license managing section controls the storage of the software into the software storage section based on the license information at the time of provision of the software whose license permission is required from a providing device that provides the software, the software whose license permission is required includes attribute information indicating that the license permission is required, and the license managing section determines whether or not software is the software whose license permission is required, based on the attribute information included in the software.

(I) In the license managing system described in (H), the providing device includes a storage medium that has stored the software whose license permission is required.

(J) In the license managing system described in (I), the providing device provides the software whose license permission is required through a communication line.

(K) In a license-fee collection system that collects a license fee to be paid as a price of license permission when a device including an execution device that executes software executes the software whose license permission is required, the device includes: a software storage device that is coupled to the execution device; a license storage device; and a license managing device that controls storage of the software whose license permission is required into the software storage device or execution of the software by the execution device based on license information stored in the license storage device. The license information corresponding to a predetermined license fee is previously stored in the license storage device, and the device is provided at a price including the predetermined license fee. When software whose license permission is required is stored or executed in the purchased device, the license managing device permits the storage of the software into the software storage device or the execution of the software by the execution device when a charge indicated by license information stored in the license storage device satisfies the license fee of the software.

(L) In the license-fee collection system described in (K), the predetermined license fee is a charge exceeding license fees of a plurality of pieces of software. When the charge indicated by the license information stored in the license storage device satisfies the license fee of the software, the license managing device allows the license storage device to store license information corresponding to a charge obtained by subtracting the license fee of the software from the charge indicated by the license information stored in the license storage device.

(M) In the license-fee collection system described in (L), a charge is paid in accordance with the license fee from a provider of the device to a provider who provides the software whose license permission is required.

(N) In the license-fee collection system described in (L), at the time of uninstall of the software whose license permission is required, the license managing device allows the license storage device to store license information corresponding to a charge obtained by adding the license fee of the uninstalled software to a charge indicated by the license information stored in the license storage device.

(O) In the license-fee collection system described in (L), the software device includes a first storage region where the storage of the software whose license permission is required is permitted and a second storage region where the storage of the software whose license permission is required is not permitted, a size of each of the first storage region and the second storage region is changed by the license information, and the software device becomes more expensive as the size of the first storage region becomes larger.

(P) A device includes: an execution device that executes software; a software storage device coupled to the execution device; and a license managing device that outputs a region specifying signal that specifies a region where the software whose license permission is required can be stored or executed among the regions of the software storage device. The storage of the software whose license permission is required into a portion outside the region defined by the region specifying signal or the execution of the software whose license permission is required that is stored in a portion outside the region defined by the region specifying signal is prohibited.

(Q) In the device described in (P), the device is a semiconductor device.

(R) In the device described in (Q), the software storage device is a flash memory.

(S) In the device described in (P), the device is an electronic apparatus.

In the foregoing, the invention made by the present inventors has been concretely described based on the embodiments. However, the present invention is not limited to the foregoing embodiments and various modifications can be made within the scope of the present invention.

EXPLANATION OF REFERENCE NUMERALS 1000 electronic apparatus
1001 execution section
1002 software storage section
1003 license storage section
1004 license managing section
1005 software storage device
1100 semiconductor device
1101, 1401 execution unit
1102, 1402 software storage unit
1103 license storage unit
1104, 1403 license managing unit
1105 flash writer
1400, 1400-1 to 1400-4 microprocessor
1900 user
1910 seller (manufacturer)
1901, 1911 device
1912 software storage device
1913 license storage device
1914 license managing device
1930 prepaid price
1931 hardware price

The invention claimed is:

1. A license managing method including a processor that executes software and a software storage device coupled to the processor, and
a license storage device that stores license information indicating the number of licenses for permitting a license of the software, and
the license managing method comprising:
license-managing, by a license managing circuit which is connected to and discrete from both the processor and the license storage device in one semiconductor package, of controlling storage of the software to be downloaded into the software storage device or execution of the software by the processor is based on the license information stored in the license storage device when the software whose license permission is required is downloaded; and
before the license managing, previously storing the license information into the license storage device,
wherein the license storage device stores history information of installed software, and the license managing circuit maintains the number of licenses indicated by the license information when software that is coincident with the history information is re-installed.

2. The license managing method according to claim 1,
wherein, in the storing, license information indicating the number of licenses for permitting licenses of a plurality of pieces of software is stored into the license storage device, the number of licenses indicated by the license information stored in the software storage device is decreased in the license managing, wherein the license managing is to control storage and execution of the software, and wherein in response to a request for the download, the license managing determines that the software provided from a software providing device is either a license-permission software that requires the license permission or that does not require the license permission, and wherein the processor comprises a central processing unit, and the license managing circuit is dedicated and localized for license-managing.

3. A semiconductor device suitable for license management, comprising:

an execution circuit that executes software;

a software storage coupled to the execution circuit a license storage that stores license information; and a license managing circuit discrete from the execution circuit that controls storage of the software whose license permission is required into the software storage or execution of the software by the execution circuit, based on the license information, wherein the execution circuit, the software storage and the license managing circuit are formed in one semiconductor package, and before license managing by the license managing circuit, the license storage device previously stores the license information, wherein the license information is information indicating the number of licenses of software, and the license managing circuit permits the storage of the software whose license permission is required into the software storage or the execution of the software by the execution circuit until the number of storage or execution times reaches the number of licenses indicated by the license information.

4. The semiconductor device suitable for license management according to claim 3, wherein the license managing circuit is specialized for license managing and localized in the semiconductor device, and the execution circuit comprises a central processing unit.

5. The semiconductor device suitable for license management according to claim 4, wherein, when the license managing circuit stores the software whose license permission is required into the software storage, the license managing circuit decreases the number of licenses indicated by the license information.

6. The semiconductor device suitable for license management according to claim 5, wherein, when the software whose license permission is required is uninstalled, the license managing circuit increases the number of licenses indicated by the license information.

7. The semiconductor device suitable for license management according to claim 5, wherein, when the software whose license permission is required in uninstalled, the license managing circuit maintains the number of licenses indicated by the license information.

8. The semiconductor device suitable for license management according to claim 5, wherein the software whose license permission is required includes attribute information indicating that the license permission is required, and the license managing circuit determines whether or not software is the software whose license permission is required, based on the attribute information included in the software.

9. The semiconductor device suitable for license management according to claim 5, wherein the license storage stores history information of installed software, and the license managing circuit maintains the number of licenses indicated by the license information when software that is coincident with the history information is re-installed.

10. The semiconductor device suitable for license management according to claim 4, wherein the license information is information indicating a storage capacity corresponding to the number of licenses in a region in the software storage.

11. The semiconductor device suitable for license management according to claim 4, wherein the license information is information indicating a point corresponding to the number of licenses.

12. The semiconductor device suitable for license management according to claim 3, wherein, when the number of activation times of the software whose license permission is required to be executed by the execution circuit exceeds a predetermined number of execution times, the license managing circuit prohibits the activation of the software.

13. The semiconductor device suitable for license management according to claim 5, wherein the semiconductor device is provided so that previously-determined license information is stored into the license storage.

14. A license managing system comprising:

an execution circuit that executes software;

a software storage coupled to the execution circuit;

a license storage that stores license information; and a license managing circuit discrete from the execution circuit that controls storage of the software whose license permission is required into the software storage based on the license information, wherein, when the software whose license permission is required is provided from a providing device that provides the software, the license managing circuit controls the storage of the software into the software storage based on the license information, wherein the execution circuit, the software storage and the license managing circuit are formed on one semiconductor chip, wherein before license managing by the license managing circuit, the license storage stores the license information, wherein the license information is information indicating the number of licenses of pieces of software whose license permissions are required that can be stored in the software storage, and the license managing circuit stores the software whose license permission is required in the software storage until the number of storage times reaches the number of licenses indicated by the license information.

15. The license managing system according to claim 14, wherein the license managing circuit decreases the number of licenses indicated by the license information when the software whose license permission is required is stored into the software storage.

16. The license managing system according to claim 15, wherein the license managing circuit increases the number of licenses indicated by the license information when the software whose license permission is required is uninstalled.

17. The license managing system according to claim 15, wherein the license managing circuit maintains the number of licenses indicated by the license information when the software whose license permission is required is uninstalled.

18. A semiconductor device, comprising:
a processor configured to execute at least one of a fee-charging software and a charge-free software; and
a storage configured to:
   store license information indicating the number of licenses of software; and
   store history information of installed software,
   wherein the fee-charging software is installed to the semiconductor device, the number of the license information in the storage is decreased, and when the charge free software is installed to the semiconductor device, the number of the license information in the storage is not decreased,
wherein the number of licenses indicated by the license information is maintained when software that is coincident with the history information is re-installed, and
wherein before license managing, the storage stores the license information.

\* \* \* \* \*